United States Patent
Shirasaki et al.

(10) Patent No.: US 9,555,810 B2
(45) Date of Patent: Jan. 31, 2017

(54) TRANSMISSION CONTROL DEVICE OF MOTORCYCLE

(71) Applicant: Mitsubishi Electric Corporation, Tokyo (JP)

(72) Inventors: Mitsuaki Shirasaki, Tokyo (JP); Kenichi Yamagata, Tokyo (JP); Masahiko Nomura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 48 days.

(21) Appl. No.: 14/730,493

(22) Filed: Jun. 4, 2015

(65) Prior Publication Data

US 2016/0214614 A1 Jul. 28, 2016

(30) Foreign Application Priority Data

Jan. 23, 2015 (JP) .................... 2015-010803

(51) Int. Cl.
*B60W 10/06* (2006.01)
*B60W 30/19* (2012.01)
*B60W 10/11* (2012.01)

(52) U.S. Cl.
CPC ............. *B60W 30/19* (2013.01); *B60W 10/06* (2013.01); *B60W 10/11* (2013.01); *B60W 2510/0208* (2013.01); *B60W 2510/101* (2013.01); *B60W 2540/16* (2013.01); *B60W 2710/0605* (2013.01); *B60W 2710/0616* (2013.01);
(Continued)

(58) Field of Classification Search
CPC ............... Y10T 477/675; Y10T 477/68; Y10T 477/6808; B60W 30/19; B60W 10/11; B60W 10/06; B60W 2710/0616; B60W 2710/0605; B60W 2540/16; B60W 2710/1005; B60W 2510/02008; B60W 2510/101
See application file for complete search history.

(56) References Cited

U.S. PATENT DOCUMENTS 5,079,969 A * 1/1992 Kato .................... B60W 30/18
477/109
2006/0068975 A1 3/2006 Kobayashi et al.
(Continued)

FOREIGN PATENT DOCUMENTS

JP 4392794 B2 1/2010
JP 5041974 B2 10/2012

OTHER PUBLICATIONS

Communication dated Nov. 4, 2015 from the Japanese Patent Office in counterpart application No. 2015-010803.

*Primary Examiner* — Roger Pang
(74) *Attorney, Agent, or Firm* — Sughrue Mion, PLLC; Richard C. Turner

(57) ABSTRACT

A motorcycle's transmission control device is provided in which, in a case of a clutchless shift operation, disengagement of a fit of gears of a transmission and the fit of subsequent gears thereof can be smoothly achieved. A throttle operation unit controls the degree of opening of a throttle valve to become a first throttle opening-degree when a clutchless shifting unit determines that a clutchless down-shift operation can be implemented, and controls the degree of opening of the throttle valve to become a second throttle opening-degree when the clutchless shifting unit determines that a fit between shift gears is disengaged by the clutchless down-shift operation.

10 Claims, 13 Drawing Sheets

(52) U.S. Cl.
CPC .. *B60W 2710/1005* (2013.01); *Y10T 477/675* (2015.01); *Y10T 477/68* (2015.01); *Y10T 477/6808* (2015.01)

(56) References Cited

U.S. PATENT DOCUMENTS

| | | | | |
|---|---|---|---|---|
| 2007/0243973 | A1* | 10/2007 | Minami | B60W 30/19 477/109 |
| 2008/0119324 | A1 | 5/2008 | Watanabe | |
| 2008/0149409 | A1* | 6/2008 | Watanabe | B60W 10/02 180/219 |
| 2009/0178874 | A1* | 7/2009 | Mizutani | F02D 31/001 180/338 |
| 2015/0329011 | A1* | 11/2015 | Kawai | B62M 7/02 701/22 |

* cited by examiner

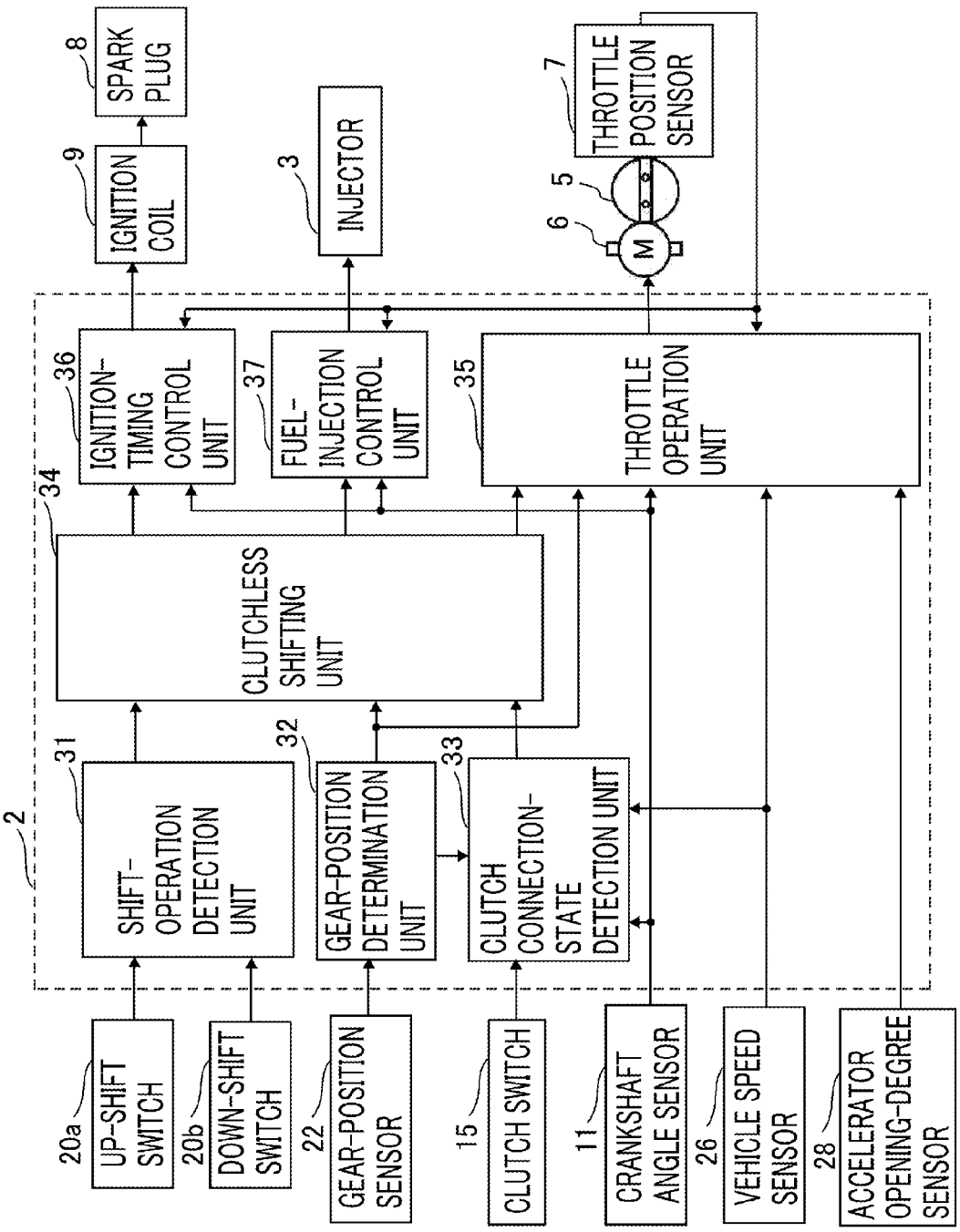

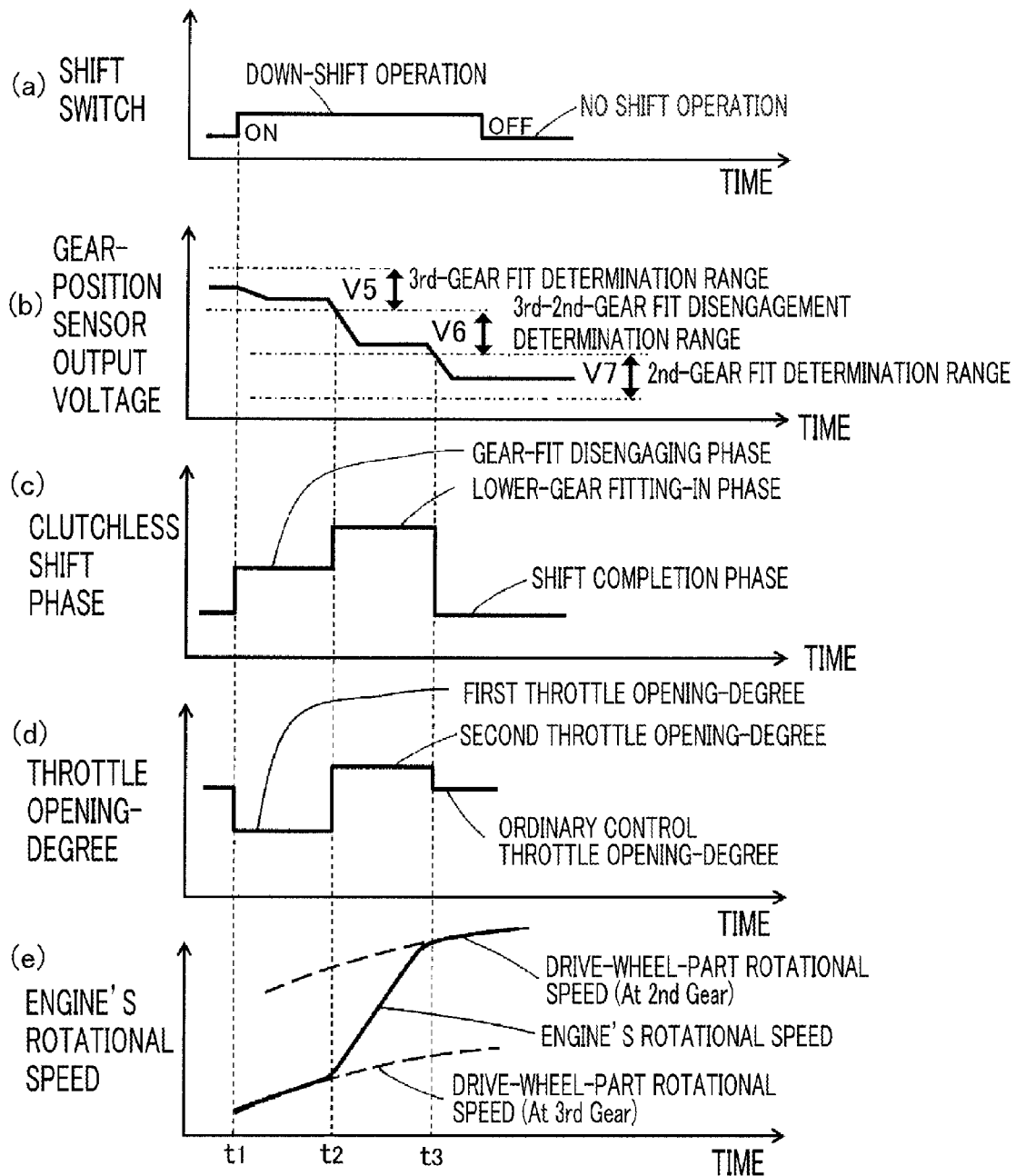

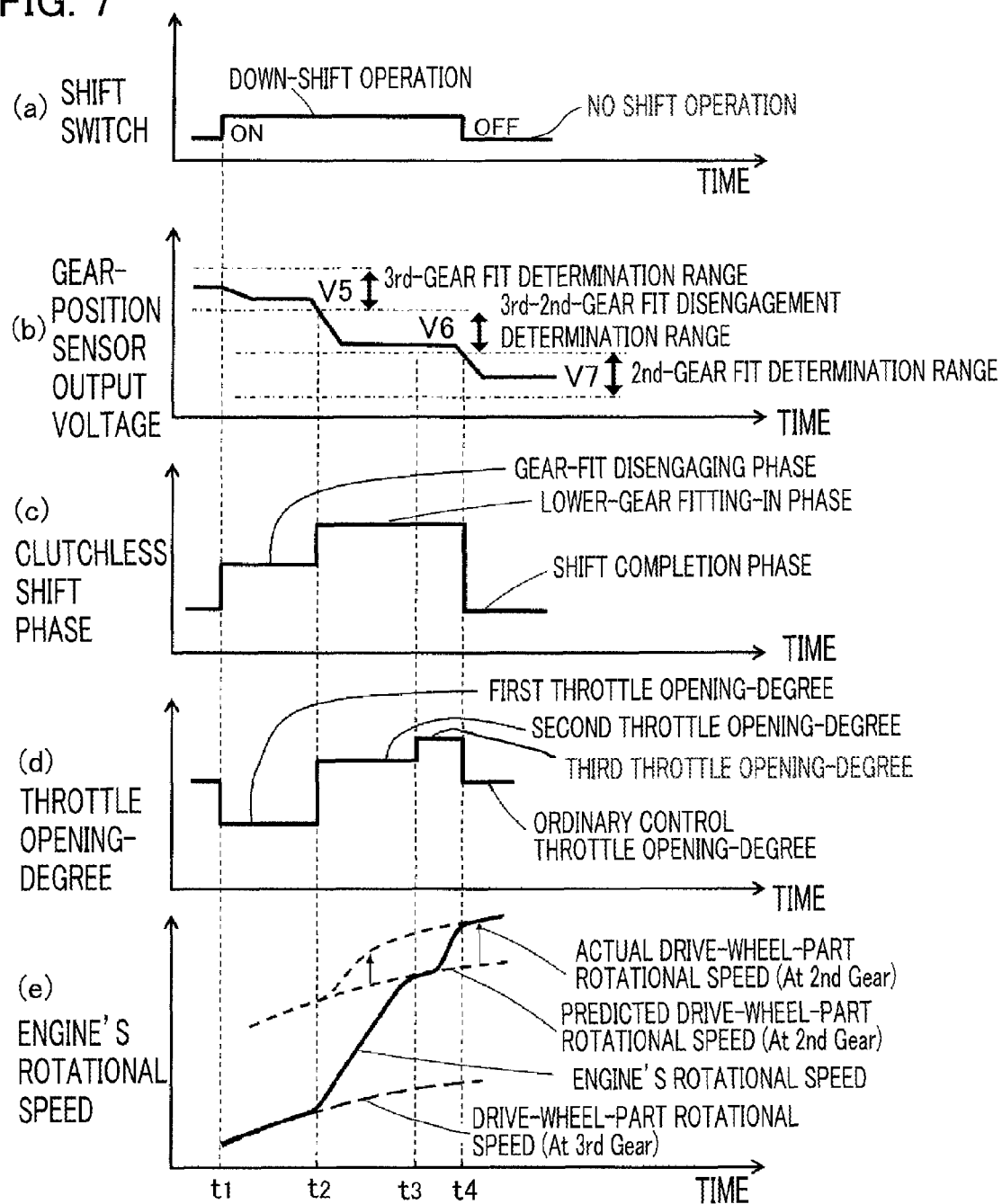

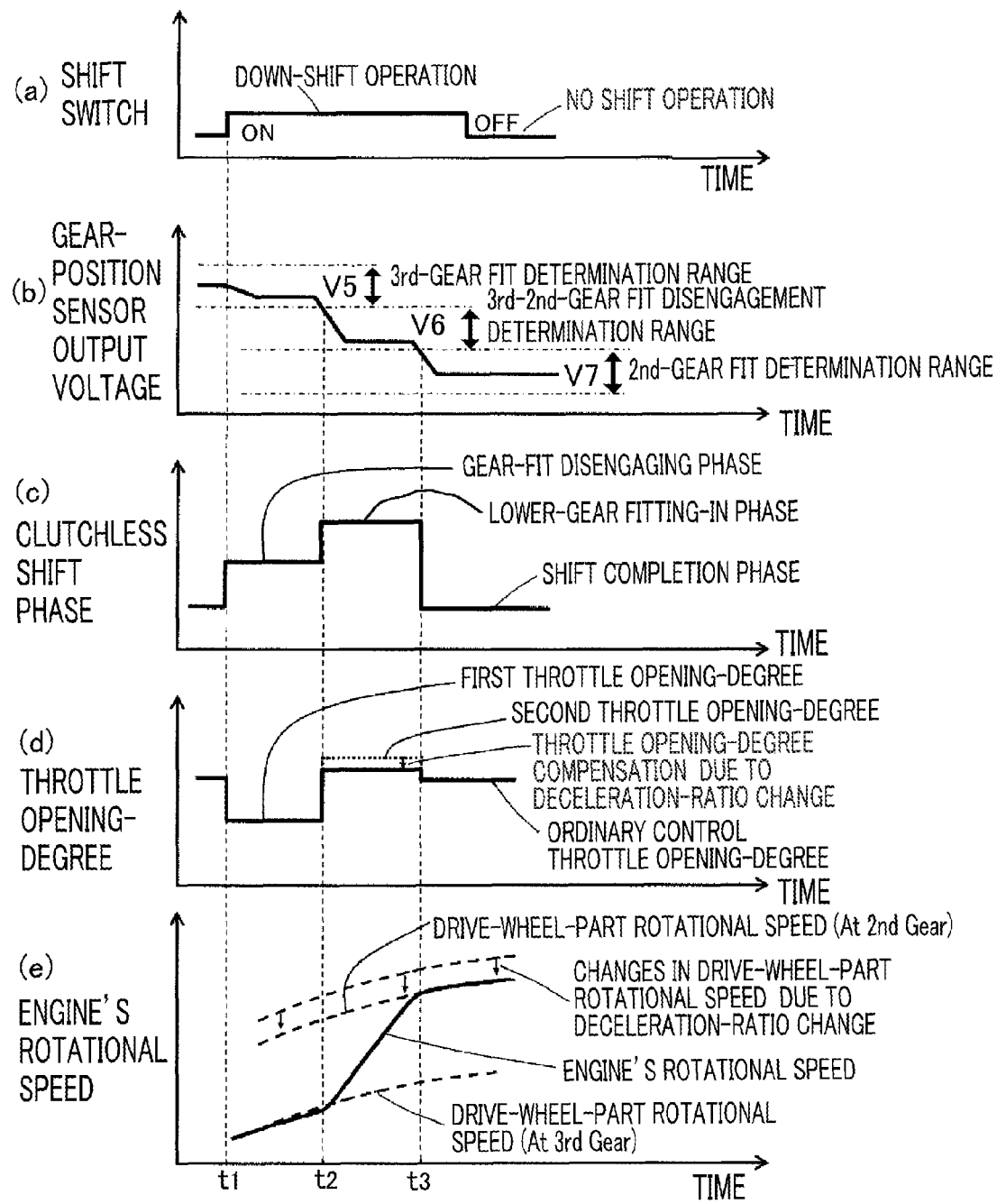

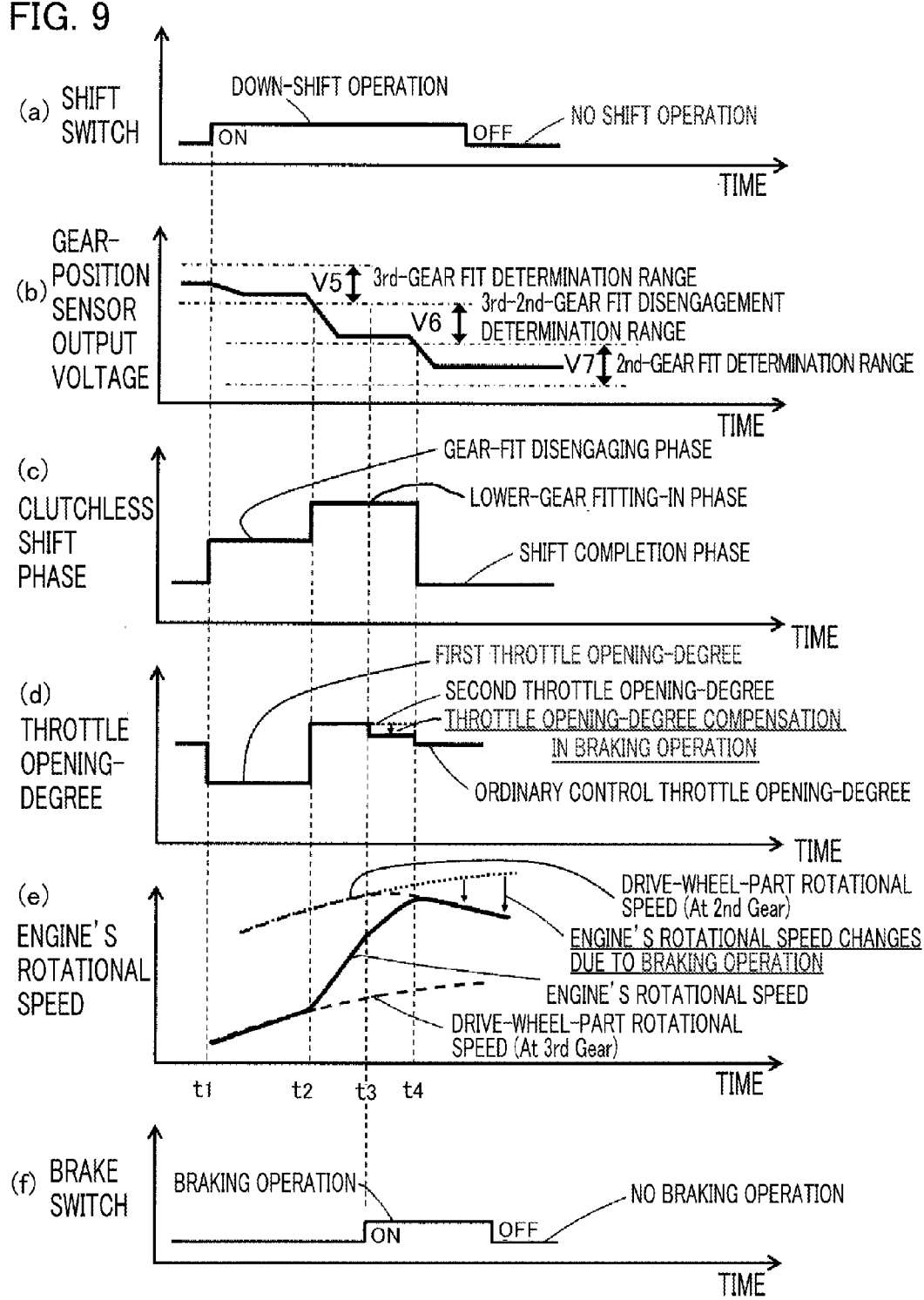

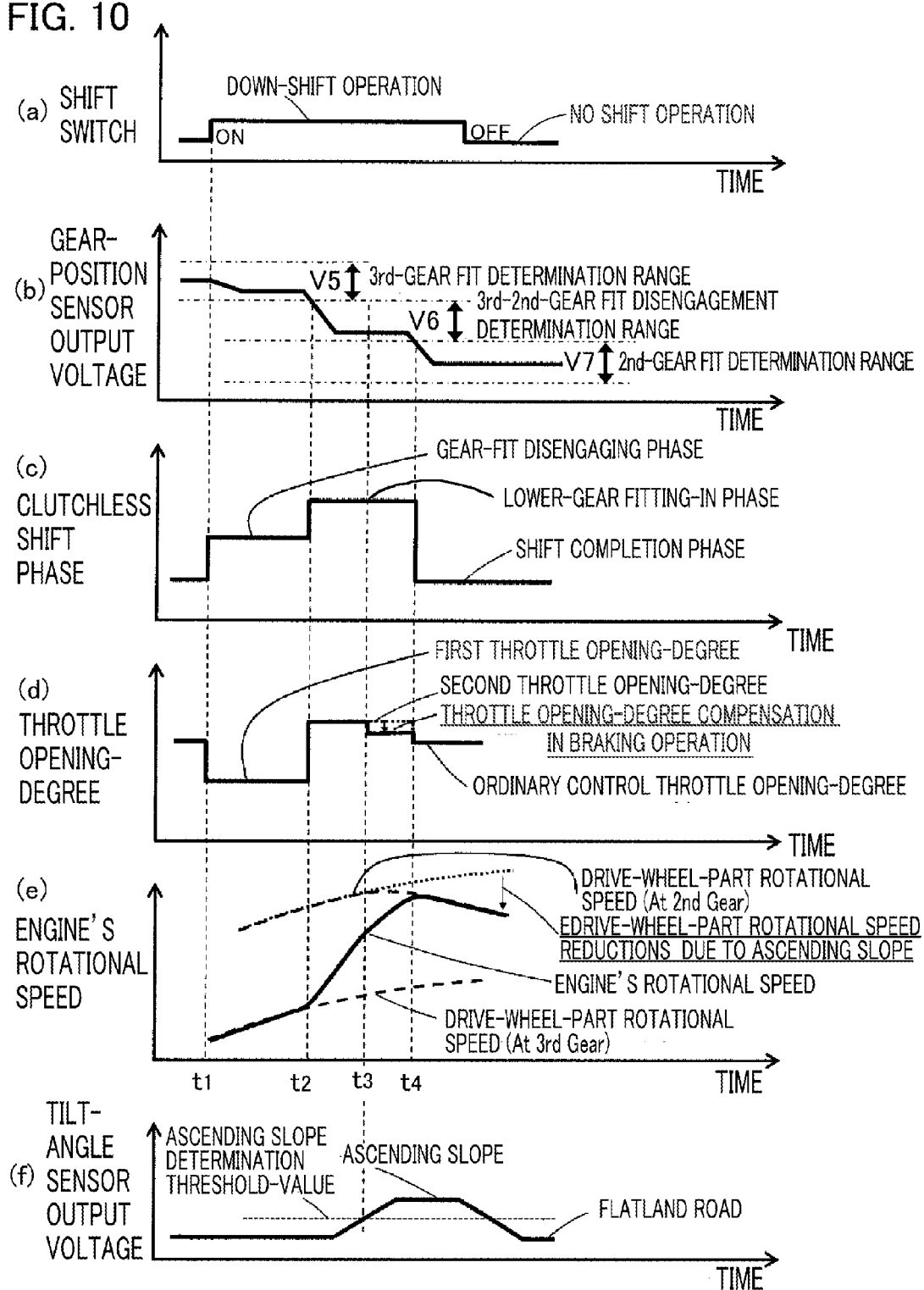

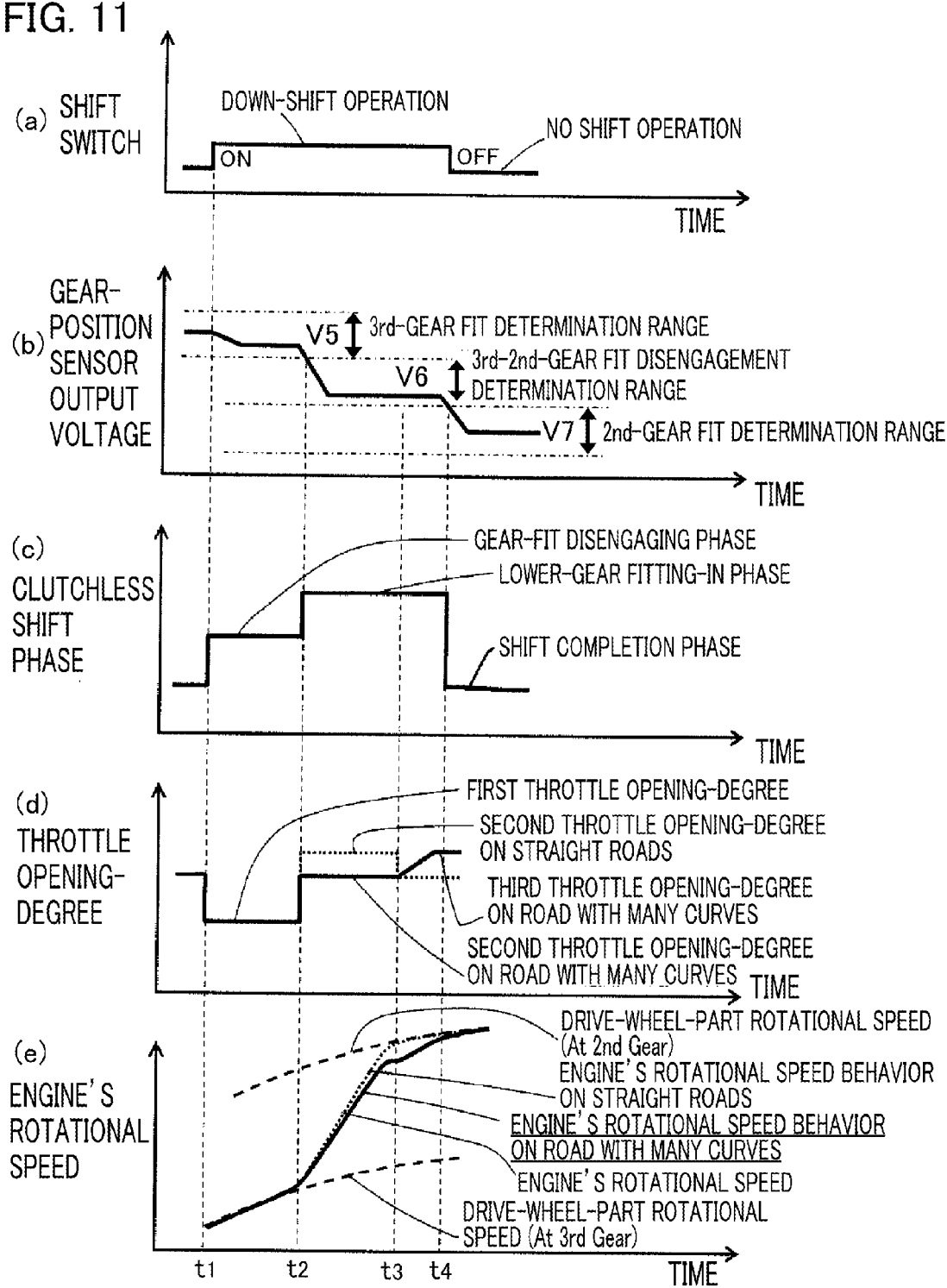

TRANSMISSION CONTROL DEVICE OF MOTORCYCLE

BACKGROUND OF THE INVENTION

1. Field of the Invention

The present invention relates to a transmission control device of a motorcycle, and in more particular to a transmission control device of a motorcycle in which a rider can perform a shift by a shift operation of a transmission without performing a clutch operation.

2. Description of the Related Art

In a motorcycle, when a shift operation is performed by a manual transmission, usually, a rider disconnects a clutch and subsequently performs an up-shift operation or down-shift operation, and lastly connects the clutch so that the shift operation is completed. Meanwhile, in a motorcycle for racing, there are cases in which the rider may perform an up-shift operation or down-shift operation without performing a clutch operation (hereinafter referred to as a "clutchless shift operation") because a more prompt shift operation is required.

In a case of a clutchless shift operation, a shift operation is performed in a state in which torque is transmitted from an engine part to a drive-wheel part, or from a drive-wheel part to an engine part, so that it is difficult to disengage a mesh of gears. For this reason, the rider must adjust an engine's output to perform disengagement of the mesh of gears, and a mesh to next gears.

However, it is difficult for the rider to suitably perform such an output adjustment of the engine in various operating states. For this reason, when the rider performs a clutchless shift operation in a state in which an output adjustment of the engine is not suitable, there are cases in which smooth shifts cannot be performed.

Hence, as countermeasures to this, devices are developed in which an engine's output can be controlled according to a clutchless shift operation by the rider. For example, in a conventional technology disclosed in Japanese Patent Publication No. 5041974, the technology related to a clutchless shift operation is disclosed in that, in a shift operation of a transmission, a mesh of gears can be easily disengaged by reducing rotational force transmitted between an input shaft and an output shaft of the transmission.

In addition, in Japanese Patent Publication No. 4392794, a technology related to a clutchless shift operation is disclosed in which, by performing an open movement to a predetermined degree of opening on a throttle valve at a time of a down-shift operation, an engine's output after performing a mesh to next gears is smoothly changed, and shift shock produced at a time of the gear mesh is mitigated.

Problems to be Solved by the Invention

According to the conventional technology disclosed in Japanese Patent Publication No. 5041974, it is so arranged that, when a mesh of gears of a transmission is to be disengaged, a shift operation of the transmission is smoothly performed by controlling a throttle valve so that torque being meshed with the gears is relieved; however, no mention is made of controlling a throttle valve so that, in a mesh of next gears after the shift operation, the mesh of gears is smoothly performed by synchronizing a rotational speed of gears on an engine part in the transmission with a rotational speed of gears on a drive-wheel part therein. Meanwhile, according to a conventional technology disclosed in Japanese Patent Publication No. 4392794, a throttle valve is controlled so that, in a mesh of next gears after a shift operation, the mesh of gears is smoothly performed by synchronizing a rotational speed of gears on an engine part in the transmission with a rotational speed of gears on a drive-wheel part therein; however, no mention is made of smoothly performing a shift operation of a transmission, when the mesh of gears of the transmission is to be disengaged, by controlling a throttle valve so that torque being meshed with the gears is relieved.

For example, as a situation in which the rider desires to perform a down-shift operation without a clutch operation, there are cases in which a down-shift operation is performed to resolve lack of an engine torque at the time of an ascending slope running, a down-shift operation is performed when another vehicle is to be passed, and so forth. In these cases, when timing of a mesh to next gears is focused, in order to achieve the mesh to next gears, it is required to open a throttle valve so as to increase an engine's rotational speed, so that there arises a problem in that the throttle valve cannot be closed due to a decrease of an engine's output that is required to disengage the mesh of gears, resulting in the mesh of gears being not disengaged. Meanwhile, when disengagement of a mesh of gears is focused, in order to disengage the mesh of gears, it is required to close the throttle valve so as to reduce an engine's output, so that there arises a problem in that the throttle valve cannot be opened due to an increase of an engine's rotational speed required to perform a mesh to next gears; and as a result, the mesh to next gears cannot be performed.

In addition, in a clutchless down-shift operation during deceleration, it would be probable that a mesh of gears can be disengaged by making the degree of throttle-valve opening larger in following with timing of a mesh to next gears so as to achieve a zero torque state in which an engine's output torque disappears in a portion of the gear mesh in a process of the changing output torque. However, because a zero torque state instantaneously occurs, there arises a problem in that, at a time of disengagement of a mesh of gears, there is a case in which the zero torque state cannot be made in coincidence, so that the disengagement of a mesh of gears cannot be performed. Moreover, there arises a problem in that, in following with timing of disengagement of a mesh of gears, even if the disengagement of a mesh of gears can be achieved by making the degree of throttle-valve opening larger to take on a zero torque state, it is required to make the degree of throttle-valve opening further larger in order to subsequently perform a mesh to next gears; however, because of undergoing deceleration, there is a case in which an engine's rotational speed is low so that the mesh to next gears cannot be performed.

The present invention has been directed at solving those problems in conventional technologies as described above, and an object of the invention is to provide a motorcycle's transmission control device in which, in a case of a clutchless shift operation, disengagement of a fit of gears of a transmission and the fit of subsequent gears thereof can be smoothly achieved.

SUMMARY OF THE INVENTION

Means for Solving the Problems

A transmission control device of a motorcycle according to the present invention comprises:

a manual transmission including a plurality of shift gears for transmitting an output of an engine mounted on the motorcycle to a drive wheel of the motorcycle;

a shift operation unit operated by a rider of the motorcycle, for controlling a selection of the plurality of shift gears and a fit between shift gears being selected, and for performing an up-shift operation or a down-shift operation of the manual transmission;

a shift-operation detection unit for detecting a state of an up-shift operation or a down-shift operation performed by the shift operation unit;

a gear-position determination unit for detecting a state of a selection of the shift gears, and a state of a fit between shift gears being selected;

a clutch mounted between the engine and the manual transmission, for connecting or disconnecting between the engine and the manual transmission by an operation of the rider;

a clutch connection-state detection unit for detecting a connection state of the clutch;

a clutchless shifting unit for performing determination whether or not a clutchless down-shift operation, in which the rider achieves a down-shift operation without disconnecting the clutch based on information from the shift operation unit, the gear-position determination unit and the clutch connection-state detection unit, can be implemented, and for performing determination whether or not a fit between shift gears being selected is disengaged by the clutchless down-shift operation;

a throttle operation unit for controlling an amount of intake air into the engine by adjusting a degree of opening of a throttle valve mounted in an intake pipe of the engine;

a fuel-injection control unit for controlling an amount of fuel injection into the engine; and an ignition-timing control unit for controlling ignition-timing of the engine, wherein the throttle operation unit controls a degree of opening of the throttle valve to become a first throttle opening-degree when the clutchless shifting unit determines that a clutchless down-shift operation can be implemented, and controls a degree of opening of the throttle valve to become a second throttle opening-degree when the clutchless shifting unit determines that a fit between shift gears being selected is disengaged by the clutchless down-shift operation.

Effects of the Invention

According to the transmission control device of a motorcycle in the present invention, the transmission control device is so configured that comprises: a manual transmission including a plurality of shift gears for transmitting an output of an engine mounted on the motorcycle to a drive wheel of the motorcycle; a shift operation unit operated by a rider of the motorcycle, for controlling a selection of the plurality of shift gears and a fit between shift gears being selected, and for performing an up-shift operation or a down-shift operation of the manual transmission; a shift-operation detection unit for detecting a state of an up-shift operation or a down-shift operation performed by the shift operation unit; a gear-position determination unit for detecting a state of a selection of the shift gears, and a state of a fit between shift gears being selected; a clutch mounted between the engine and the manual transmission, for connecting or disconnecting between the engine and the manual transmission by an operation of the rider; a clutch connection-state detection unit for detecting a connection state of the clutch; a clutchless shifting unit for performing determination whether or not a clutchless down-shift operation, in which the rider achieves a down-shift operation without disconnecting the clutch based on information from the shift operation unit, the gear-position determination unit and the clutch connection-state detection unit, can be implemented, and for performing determination whether or not a fit between shift gears being selected is disengaged by the clutchless down-shift operation; a throttle operation unit for controlling an amount of intake air into the engine by adjusting a degree of opening of a throttle valve mounted in an intake pipe of the engine; a fuel-injection control unit for controlling an amount of fuel injection into the engine; and an ignition-timing control unit for controlling ignition-timing of the engine, wherein the throttle operation unit controls a degree of opening of the throttle valve to become a first throttle opening-degree when the clutchless shifting unit determines that a clutchless down-shift operation can be implemented, and controls a degree of opening of the throttle valve to become a second throttle opening-degree when the clutchless shifting unit determines that a fit between shift gears being selected is disengaged by the clutchless down-shift operation, so that it is possible to obtain the motorcycle's transmission control device in which, in a case of a clutchless shift operation, disengagement of a fit of gears of a transmission and the fit of subsequent gears thereof can be smoothly achieved.

BRIEF DESCRIPTION OF DRAWINGS

The foregoing and other objects, features, aspects and advantages of the present invention will become more apparent from the following detailed description of the present invention when taken in conjunction with the accompanying drawings.

FIG. 3 is a block diagram illustrating a functional configuration of the motorcycle's transmission control device according to Embodiment 1 of the present invention;

FIG. 5 is an illustrative diagram for explaining the states of an output voltage of the gear-position sensor, a throttle opening-degree, an engine's rotational speed, etc. in down-shift operations, in the motorcycle's transmission control device according to Embodiment 1 of the present invention;

FIG. 7 is an illustrative diagram for explaining the states of an output voltage of the gear-position sensor, a throttle opening-degree, an engine's rotational speed, etc. when a third throttle opening-degree is used in a clutchless downshift operation, in the motorcycle's transmission control device according to Embodiment 1 of the present invention;

FIG. 8 is an illustrative diagram for explaining the states of an output voltage of the gear-position sensor, a throttle opening-degree, an engine's rotational speed, etc. in a case in which a clutchless down-shift is performed when a reduction ratio of gears is changed, in the motorcycle's transmission control device according to Embodiment 1 of the present invention;

FIG. 9 is an illustrative diagram for explaining the states of an output voltage of the gear-position sensor, a throttle opening-degree, an engine's rotational speed, etc. when a braking operation is performed during a clutchless down-shift, in the motorcycle's transmission control device according to Embodiment 1 of the present invention;

FIG. 10 is an illustrative diagram for explaining the states of an output voltage of the gear-position sensor, a throttle opening-degree, an engine's rotational speed, etc. when a clutchless down-shift is performed during an ascending slope running, in the motorcycle's transmission control device according to Embodiment 1 of the present invention;

FIG. 11 is an illustrative diagram for explaining the states of an output voltage of the gear-position sensor, a throttle opening-degree, an engine's rotational speed, etc. in a case in which a clutchless down-shift is performed when a navigation system determines the road with many curves, in the motorcycle's transmission control device according to Embodiment 1 of the present invention.

DETAILED DESCRIPTION OF THE PREFERRED EMBODIMENTS

Hereunder, preferred embodiments according to the present invention will be described in detail with reference to the accompanying drawings.

Embodiment 1

Figure 1:
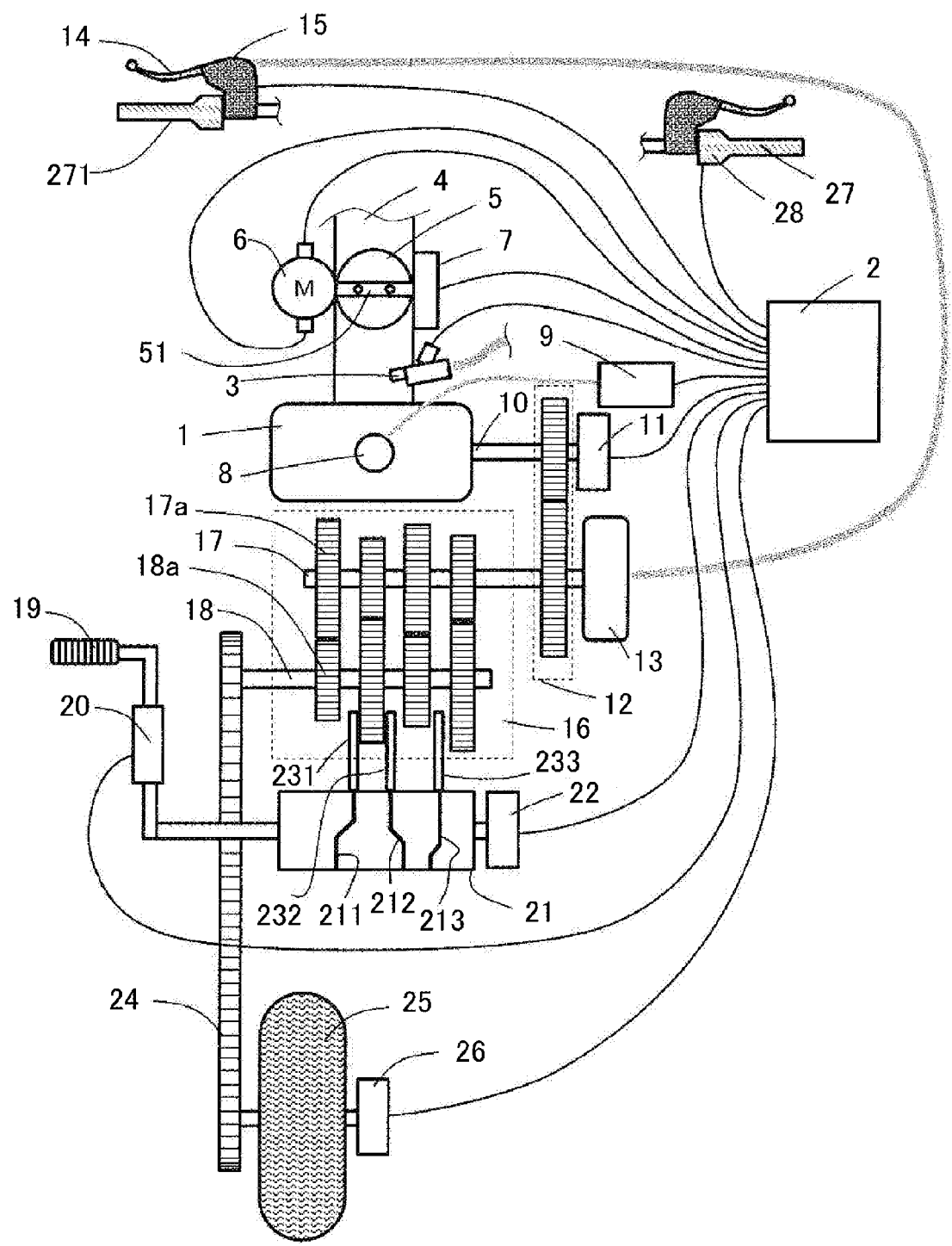
FIG. 1 is a schematic configuration diagram of an engine, a transmission and a shift mechanism of a motorcycle which applies a motorcycle's transmission control device according to Embodiment 1 of the present invention.

Hereinafter, the explanation will be made for a motorcycle's transmission control device according to Embodiment 1 of the present invention. FIG. 1 is a schematic configuration diagram of an engine, a transmission and a shift mechanism of a motorcycle which applies the motorcycle's transmission control device according to Embodiment 1 of the present invention. In FIG. 1, an engine 1 mounted on a vehicle being the motorcycle is adjusted for the engine's output by a control unit 2 mounted on the vehicle. Namely, the control unit 2 adjusts an output of the engine 1 by controlling the amount of intake air, the amount of fuel injection, ignition-timing, etc. of the engine, based on information from various kinds of sensors and switches as will be described later.

With an intake pipe 4 connected to a cylinder (not shown in the figure) of the engine 1, an injector 3 and a throttle valve 5 are provided. The amount of fuel injected from the injector 3 into the intake pipe 4 is adjusted by the control unit 2. A throttle control motor 6 makes the throttle valve 5 move rotationally by centering a throttle valve shaft 51 so that a rotational angle of the throttle valve 5, namely, the degree of opening of the throttle valve 5 is controlled. A throttle position sensor 7 detects the rotational angle of the throttle valve 5, and inputs a throttle position signal into the control unit 2.

The control unit 2 adjusts the rotational angle of the throttle valve 5, through the use of the throttle position signal being inputted, by controlling the throttle control motor 6, and adjusts the amount of intake air to be sucked into the intake pipe 4. Into the interior of a combustion chamber (not shown in the figure) formed by the cylinder and a piston (not shown in the figure) of the engine 1, a mixture of air and fuel adjusted as described above is sucked through an intake valve (not shown in the figure).

A spark plug 8 mounted on the engine 1 generates spark discharge across opposing gaps of a pair of electrodes (not shown in the figure), and ignites the mixture of air and fuel sucked into the combustion chamber of the engine 1. An ignition coil 9 applies a high spark voltage across the pair of electrodes of the spark plug 8, so that spark discharge is generated on the spark plug 8. The control unit 2 adjusts, by controlling the energization to the ignition coil 9, generation timing of the spark discharge by the ignition coil 9, namely ignition-timing of the engine 1.

An output of the engine 1 caused on the basis of combustion of the mixture in the combustion chamber of the engine 1 undergoes from a crankshaft 10 through a primary reduction mechanism 12 and a clutch 13, and is transmitted to a main shaft 17 of a manual transmission 16 as will be described later.

A crankshaft angle sensor 11 mounted on the crankshaft 10 detects a rotational speed and a rotational angle of the crankshaft 10, and inputs a crankshaft angle signal corresponding to the rotational speed and the rotational angle being detected into the control unit 2.

The clutch 13 is set into a disconnection state when a rider grips a clutch lever 14 so that transmission of the torque is interrupted between the primary reduction mechanism 12 and the manual transmission 16. A clutch switch 15 built in the clutch lever 14 includes a contact which opens/closes in accordance with an operating state of the clutch lever 14 by the rider. Namely, a contact of the clutch switch 15 is turned "ON" when it is in a state in which the rider grips the clutch lever 14 to pull toward a side of a grip portion 271 of handlebars, and the contact is turned "OFF" in a state in which the rider releases the clutch lever 14 to be open. A clutch switch signal which corresponds to an ON/OFF of the contact of the clutch switch 15 is inputted into the control unit 2.

The torque, transmitted from the crankshaft 10 of the engine 1 to the main shaft 17 of the manual transmission 16 by means of the primary reduction mechanism 12, is transmitted from main shaft gears 17a to counter shaft gears 18a, and is transmitted from the counter shaft gears 18a to a drive wheel 25 of the vehicle by means of a counter shaft 18 and a drive chain 24.

A vehicle speed sensor 26 mounted on the drive wheel 25 detects a rotational speed of the drive wheel 25, and inputs a vehicle-speed signal corresponding to the vehicle speed being detected into the control unit 2.

On an accelerator grip 27 provided with a handlebar of the vehicle, an accelerator opening-degree sensor 28 is mounted. The accelerator opening-degree sensor 28 inputs, into the control unit 2, an accelerator opening-degree signal which corresponds to an operational amount of an accelerator operation by the rider.

The manual transmission 16 includes the main shaft 17 interconnected to the crankshaft 10 of the engine 1 by means of the primary reduction mechanism 12 and the clutch 13, the main shaft gears 17a constituting a plurality of gears mounting on the main shaft 17, the counter shaft gears 18a constituting a plurality of gears to mesh with the main shaft gears 17a, and the counter shaft 18 mounting on the counter shaft gears 18a. The details of a structure of the manual transmission 16 will be described later.

On a shift pedal 19 functioning as a shift operation unit which is operated by a foot of the rider, a shift switch 20 is mounted. This shift switch 20 is so constructed that it is turned "ON" when the rider performs a down-shift operation by depressing the shift pedal 19 or an up-shift operation by releasing back the shift pedal 19 (hereinafter these operations are referred to collectively as a "shift operation"). A shift switch signal outputted from the shift switch 20 is inputted into the control unit 2.

Note that, when it is required to perform the detection by distinguishing an up-shift operation and a down-shift operation, it is necessary to individually provide an up-shift switch which is turned "ON" in an up-shift operation and a down-shift switch which is turned "ON" in a down-shift operation.

A shift drum 21 moves rotationally by the rider's shift operation. Here, the shift drum 21 is so constructed that moves rotationally the manual transmission 16 by the quantity to shift one gear in accordance with one shift operation. On the shift drum 21, three shift grooves 211, 212 and 213, each of which being bent, are engraved. Three shift forks 231, 232 and 233 are mounted on the shift drum 21; a basal portion of the shift fork 232 is engaged slidingly movable in the corresponding shift groove 212, and a basal portion of the shift fork 233 is engaged slidingly movable in the corresponding shift groove 213.

When the shift drum 21 moves rotationally, the respective shift forks 231, 232 and 233 slide on one side or the other side in an axial direction of the shift drum 21 in accordance with bend shapes of the shift grooves 211, 212 and 213 in which they are engaged. The shift forks 231, 232 and 233 can slide a slide gear, which can be movably slid in a direction in which its axial center extends, among a plurality of gears fixed on the main shaft 17 or the counter shaft 18, i.e., among that of the main shaft gears 17a or the counter shaft gears 18a.

On the shift drum 21, a gear-position sensor 22 is mounted. The gear-position sensor 22 detects a rotational position of the shift drum 21, and inputs a gear-position sensor signal corresponding to the rotational position of the shift drum 21 being detected into the control unit 2. The gear-position sensor signal outputted from the gear-position sensor 22 corresponds to a gear position of the manual transmission 16.

Figure 2A:
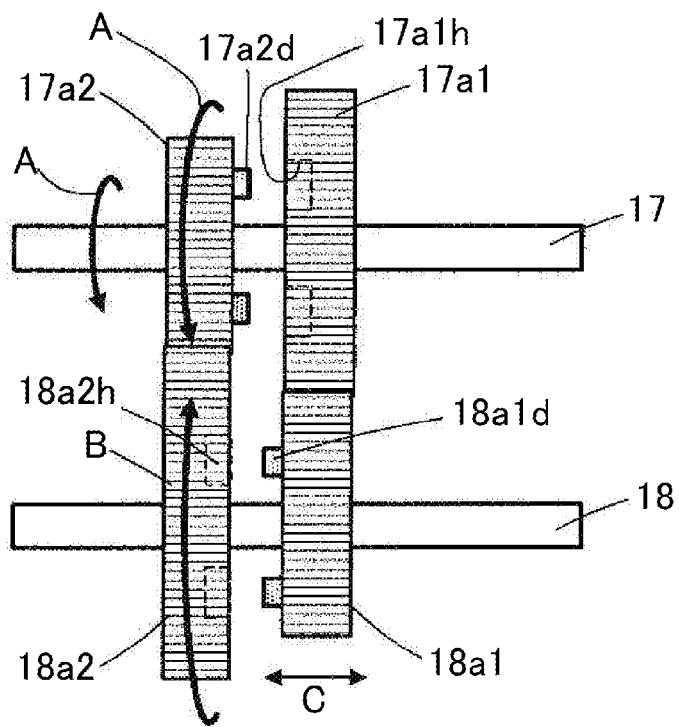
FIGS. 2A and 2B are illustrative diagrams each for explaining movements of gears in a shift operation, in the motorcycle's transmission control device according to Embodiment 1 of the present invention.
Figure 2B:
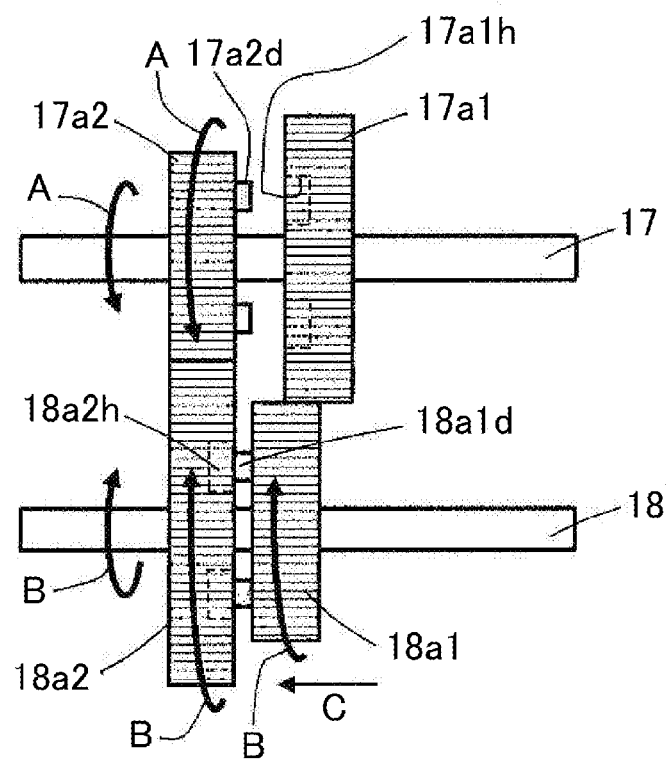

FIGS. 2A and 2B are illustrative diagrams each for explaining movements of gears in a shift operation, in the motorcycle's transmission control device according to Embodiment 1 of the present invention; different operation states are shown in FIG. 2A and FIG. 2B. In addition, in FIG. 2A and FIG. 2B, main shaft gears 17a1 and 17a2 are only shown among the plurality of main shaft gears 17a of the manual transmission 16, and the counter shaft gears 18a1 and 18a2 are only shown among the plurality of counter shaft gears 18a.

In FIG. 2A and FIG. 2B, the main shaft gear 17a2 is attached onto the main shaft 17 in such a structure that the main shaft gear 17a2 is movable in an axial direction of the main shaft 17, and is fixed in a rotational direction of the main shaft 17 with respect to the main shaft 17. The main shaft gear 17a1 is attached onto the main shaft 17 in such a structure that movement of the main shaft gear 17a1 is prohibited along an axial direction of the main shaft 17, and the main shaft gear 17a1 is rotationally movable with respect to the main shaft 17.

In addition, on a part of the main shaft gear 17a2 in a side facing the main shaft gear 17a1, a plurality of dogs 17a2d is provided which protrudes in the axial direction of the main shaft 17. On a part of the main shaft gear 17a1 in a side facing the main shaft gear 17a2, a plurality of dog holes 17a1h is provided being depressed in the axial direction of the main shaft 17. These dog holes 17a1h are placed corresponding to each of the plurality of dogs 17a2d provided on the main shaft gear 17a2, and can make a fit with the corresponding dogs 17a2d.

The counter shaft gear 18a1 is attached onto the counter shaft 18 in such a structure that the counter shaft gear 18a1 is movable in an axial direction of the counter shaft 18, and is fixed in a rotational direction of the counter shaft 18 with respect to the counter shaft 18. The counter shaft gear 18a2 is attached onto the counter shaft 18 in such a structure that movement of the counter shaft gear 18a2 is prohibited along an axial direction of the counter shaft 18, and the counter shaft gear 18a2 is rotationally movable with respect to the counter shaft 18.

Moreover, on a part of the counter shaft gear 18a1 in a side facing the counter shaft gear 18a2, a plurality of dogs 18a1d is provided which protrudes in the axial direction of the counter shaft 18. On a part of the counter shaft gear 18a2 in a side facing the counter shaft gear 18a1, a plurality of dog holes 18a2h is provided being depressed in the axial direction of the counter shaft 18. These dog holes 18a2h placed corresponding to each of the plurality of dogs 18a1d provided on the counter shaft gear 18a1, and can make a fit with the corresponding dogs 18a1d.

Note that, the structures of the main shaft gears 17a other than the main shaft gears 17a1 and 17a2 are approximately the same or similar to the main shaft gears 17a1 and 17a2, and the structures of the counter shaft gears 18a other than the counter shaft gears 18a1 and 18a2 are approximately the same or similar to the counter shaft gears 18a1 and 18a2, so that their explanation is omitted.

In a state shown in FIG. 2A, the main shaft gear 17a2 integrally rotates in the direction of the arrows "A" with the main shaft 17 that rotates in the direction of the arrows "A"; the counter shaft gear 18a2 meshed with the main shaft gear 17a2 idly rotates in the direction of the arrow "B" with respect to the counter shaft 18. Meanwhile, the main shaft gear 17a1 is in an idle state with respect to the main shaft 17. Therefore, in this state, the giving and receiving of rotational torque do not exist between the main shaft 17 and the counter shaft 18, so that they are in a state of so-called "neutral."

In the state shown in FIG. 2A as described above, the counter shaft gear 18a2 meshed with the main shaft gear 17a2 idly rotates in the direction of the arrow "B" with respect to the counter shaft 18; however, in a state shown in FIG. 2B, the counter shaft gear 18a1 slides from the position shown in FIG. 2A in the direction of the arrow "C"; a plurality of dogs 18a1d of the counter shaft gear 18a1 are fitted into the corresponding dog holes 18a2h of the counter shaft gear 18a2.

Therefore, rotational torque of the main shaft 17 in the direction of the arrows "A" is transmitted to the counter shaft gear 18a2 by means of the main shaft gear 17a2, and is further transmitted from the counter shaft gear 18a2 to the counter shaft 18 as rotational torque in the direction of the arrows "B" by means of the counter shaft gear 18a1. At this time, the counter shaft 18 is shifted with respect to the number of rotations of the main shaft 17, based on a ratio between the number of teeth of the main shaft gear 17a2 and the number of teeth of the counter shaft gear 18a2. At this time, the main shaft gear 17a1 is meshed with the counter shaft gear 18a1, so that the main shaft gear 17a1 rotates in the direction of the arrows "A"; however, the main shaft gear 17a1 is in an idle state with respect to the main shaft 17.

In addition, a state of gears in which the dogs 18a1d or the dogs 17a2d fit into the dog holes 18a2h or the dog holes 17a1h, respectively, is herein referred to as a "gear fit."

Meanwhile, when the main shaft gear 17a2 is slid, from the state of "neutral" shown in FIG. 2A, in a direction toward the main shaft gear 17a1 so that the dogs 17a2d are fitted into the dog holes 17a1h to make a gear fit, rotational torque of the main shaft 17 is transmitted from the main shaft gear 17a2 to the counter shaft 18 by means of the main shaft gear 17a1 and the counter shaft gear 18a1, so that the counter shaft 18 rotates in the direction of the arrow "B." At this time, the counter shaft 18 is shifted with respect to the number of rotations of the main shaft 17, based on a ratio between the number of teeth of the main shaft gear 17a1 and the number of teeth of the counter shaft gear 18a1. At this time, the counter shaft gear 18a2 is meshed with the main shaft gear 17a2, so that the counter shaft gear 18a2 rotates in the direction of the arrow "B"; however, the counter shaft gear 18a2 is in an idle state with respect to the counter shaft 18.

As described above, a predetermined shift is achieved by performing a gear fit of predetermined gears; however, when, in a state of a "gear fit" between the counter shaft gear 18a2 and the counter shaft gear 18a1 as shown in FIG. 2B for example, torque is transmitted from the engine 1 to the drive wheel 25, or from the drive wheel 25 to the engine 1, a large amount of pressure is produced on contacting surfaces between the dogs 18a1d and the dog holes 18a2h, so that the gear fit made by the fit between the dogs 18a1d and the dog holes 18a2h cannot be disengaged by a shift operation merely done by the rider.

Therefore, in order to disengage the gear fit in the aforementioned state shown in FIG. 2B for example, it is required to perform a shift operation after transmission of the torque between the engine 1 and the drive wheel 25 is halted by putting the clutch 13 in a disconnection state through the rider's operation of the clutch lever 14 and by interrupting the interconnection between the primary reduction mechanism 12, coupled with the crankshaft 10 of the engine 1, and the main shaft 17, or to perform a shift operation after a state is achieved in which the amount of pressure on contacting surfaces between the dogs 18a1d and the dog holes 18a2h becomes smaller by changing an output of the engine 1 and by balancing torque from the engine 1 and torque from the drive wheel 25.

For dealing therewith, in the motorcycle's transmission control device according to Embodiment 1 of the present invention, a transmission control device is so arranged that, in a case of a clutchless shift operation, disengagement of a fit of gears of a transmission and the fit of subsequent gears thereof can be smoothly achieved.

FIG. 3 is a block diagram illustrating a functional configuration of the motorcycle's transmission control device according to Embodiment 1 of the present invention. In FIG. 1 and FIG. 3, the control unit 2 includes a shift-operation detection unit 31, a gear-position determination unit 32, a clutch connection-state detection unit 33, a clutchless shifting unit 34, a throttle operation unit 35, an ignition-timing control unit 36, and a fuel-injection control unit 37.

The shift switch 20 is constituted of an up-shift switch 20a and a down-shift switch 20b. In the up-shift switch 20a, its contact is turned "ON" when the rider performs an up-shift operation by the shift pedal 19. In the down-shift switch 20b, its contact is turned "ON" when the rider performs a down-shift operation by the shift pedal 19. ON/OFF signals from the up-shift switch 20a and the down-shift switch 20b are inputted into the shift-operation detection unit 31. The shift-operation detection unit 31 determines, based on the ON/OFF signals from the up-shift switch 20a and the down-shift switch 20b, whether or not the rider performs a shift operation.

Note that, in the shift switch 20 constituted of the up-shift switch 20a and the down-shift switch 20b, a mechanism is presumed in which the contact is turned "ON" when the rider performs a shift operation as described above; however, it may be adopted that a shift sensor is used in which its voltage changes such as a strain gauge when the shift operation is performed.

A gear-position sensor signal outputted from the gear-position sensor 22 is inputted into the gear-position determination unit 32. The gear-position determination unit 32 determines a state of a selection in the gears of the manual transmission 16, and a state of its gear fit based on the inputted gear-position sensor signal. As an example of the gear-position sensor signal that the gear-position sensor 22 outputs, changes in an output voltage are illustrated in FIG. 4 as a gear-position sensor signal outputted from the gear-position sensor 22 when the gears are shifted from a Top or 5th gear to a Low or 1st gear.

Figure 4:
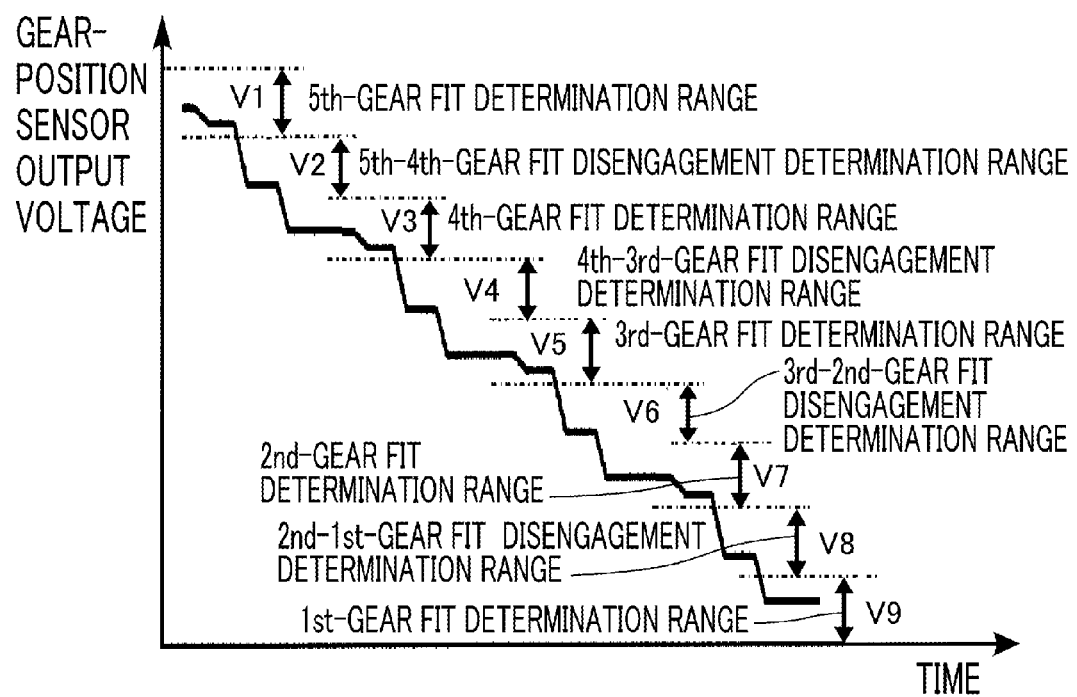
FIG. 4 is an illustrative diagram for explaining an example of changes in an output voltage of a gear-position sensor when gears are shifted from a 5th gear to a 1st gear in the motorcycle's transmission control device according to Embodiment 1 of the present invention.

Namely, FIG. 4 is an illustrative diagram for explaining an example of changes in an output voltage of the gear-position sensor when the gears are shifted from the 5th gear to the 1st gear in the motorcycle's transmission control device according to Embodiment 1 of the present invention; and the vertical axis designates the output voltage of the gear-position sensor, and the horizontal axis, time. As illustrated in FIG. 4, the output voltage of the gear-position sensor is lowered in stages in its voltage values in accordance with the states of gear fits from the 5th gear to the 1st gear. The gear-position determination unit 32 divides the voltage values of the output voltage of the gear-position sensor into the voltage-value ranges from "V1" to "V9," and determines the gear positions, as respective voltage-value ranges are defined in the following determination ranges.

V1: 5th-gear fit determination range
V2: 5th-4th-gear fit disengagement determination range
V3: 4th-gear fit determination range
V4: 4th-3rd-gear fit disengagement determination range
V5: 3rd-gear fit determination range
V6: 3rd-2nd-gear fit disengagement determination range
V7: 2nd-gear fit determination range
V8: 2nd-1st-gear fit disengagement determination range
V9: 1st-gear fit determination range In the clutch switch 15, a contact of the switch is turned "ON" when the rider operates the clutch lever 14 so that the clutch 13 is disconnected, as described above. A clutch switch signal from the clutch switch 15 is inputted into the clutch connection-state detection unit 33. The clutch connection-state detection unit 33 determines that the clutch 13 is in a connection state when the clutch switch 15 is in an "OFF" state.

Note that, it may be adopted that a detection of a clutch connection state is estimated, in place of the clutch switch 15, whether an engine's rotational speed obtained by the crankshaft angle sensor 11 is in coincidence with an engine's rotational speed calculated through the use of a gear ratio based on the information of the vehicle speed sensor 26 and the gear-position determination unit 32.

Output signals from the shift-operation detection unit 31, the gear-position determination unit 32, and the clutch connection-state detection unit 33 are inputted into the clutchless shifting unit 34. The clutchless shifting unit 34 determines, when the shift-operation detection unit 31 detects a down-shift operation by the rider, whether or not a clutchless down-shift operation is in a state which can be implemented based on the information from the gear-position determination unit 32 and the information from the clutch connection-state detection unit 33. When the clutchless shifting unit 34 determines that a clutchless down-shift operation can be implemented, a determination result of a "start of a clutchless down-shift operation" is transmitted, based on the information of a state of gear selection and a state of gear fit from the gear-position determination unit 32, to the throttle operation unit 35, the ignition-timing control unit 36, and the fuel-injection control unit 37.

The throttle operation unit 35 controls the throttle control motor 6 of the throttle valve 5 based on a throttle position signal from the throttle position sensor 7, and in accordance with an operating state such as information from the clutchless shifting unit 34, a crankshaft's rotational speed (hereinafter referred to as an "engine's rotational speed") obtained by the crankshaft angle sensor 11, an accelerator opening-degree obtained by the accelerator opening-degree sensor 28, and a vehicle speed obtained by the vehicle speed sensor 26, so that the throttle valve 5 moves rotationally to adjust a throttle opening-degree.

The ignition-timing control unit 36, from which its output signal is inputted into the ignition coil 9 and the spark plug 8, controls ignition-timing in accordance with an operating state such as information from the clutchless shifting unit 34, an engine's rotational speed obtained by the crankshaft angle sensor 11, and a throttle opening-degree obtained by the throttle position sensor 7.

The fuel-injection control unit 37, from which its output signal is inputted into the injector 3, controls the amount of fuel injection of the injector 3 in accordance with operating states such as information from the clutchless shifting unit 34, an engine's rotational speed obtained by the crankshaft angle sensor 11, and a throttle opening-degree obtained by the throttle position sensor 7.

FIG. 5 is an illustrative diagram for explaining the states of an output voltage of the gear-position sensor, a throttle opening-degree, an engine's rotational speed, etc. in down-shift operations, in the motorcycle's transmission control device according to Embodiment 1 of the present invention; the diagram shows a case of a down-shift from a 3rd gear to a 2nd gear; the vertical axis of FIG. 5(*a*) designates a state of the shift switch, the vertical axis of FIG. 5(*b*), an output voltage of the gear-position sensor, the vertical axis of FIG. 5(*c*), a clutchless shift phase, the vertical axis of FIG. 5(*d*), a throttle opening-degree, and the vertical axis of FIG. 5(*e*), an engine's rotational speed; and each of the horizontal axes designates time.

In FIG. 5, first, a down-shift operation is started by the rider who operates the shift pedal 19 at a time t1, as shown in FIG. 5(*a*). At the time t1, the down-shift switch 20*b* is turned "ON." At this time, an output voltage of the gear-position sensor 22 is in a 3rd-gear fit determination range V5 as shown in FIG. 5(*b*).

In addition, a clutchless shift phase takes on a gear-fit disengaging phase as shown in FIG. 5(*c*). According to this, a throttle opening-degree is controlled to become a first throttle opening-degree as shown in FIG. 5(*d*). As a result, torque from an engine part or a drive-wheel part meshed with the gears of the manual transmission 16 is relieved, so that a state is achieved in which gear-fit disengagement can be implemented by the rider's down-shift operation. Here, it may be adopted that the first throttle opening-degree determines by, for example, mapped data responding to a rotational speed on a drive-wheel part.

Next, when at a time t2 the output voltage of the gear-position sensor 22 shown in FIG. 5(*b*) becomes in a 3rd-2nd-gear fit disengagement determination range V6, the clutchless shift phase takes on a lower-gear fitting-in phase in which a gear to make a fit after a down-shift is the 2nd gear that is lower than the 3rd gear as shown in FIG. 5(*c*). According to this arrangement, the throttle opening-degree is controlled to a second throttle opening-degree as shown in FIG. 5(*d*). As a result as shown in FIG. 5(*e*), through the use of a vehicle speed at the 2nd gear, and a reduction ratio (a primary reduction ratio of the crankshaft and the transmission, a gear ratio at the transmission, and a secondary reduction ratio at the counter shaft and the drive wheel), an engine's rotational speed is synchronized with a rotational speed which is equivalently converted to a crankshaft's rotational speed (hereinafter referred to as a "drive-wheel-part rotational speed"), so that the gear fit can be smoothly performed. Here, it may be also adopted that the second throttle opening-degree is determined by, for example, mapped data responding to a rotational speed on a drive-wheel part, or it may be adopted that the throttle opening-degree is performed by a feedback control so as to achieve the rotational speed on a drive-wheel part.

Lastly, when at a time t3 the output voltage of the gear-position sensor 22 shown in FIG. 5(*b*) becomes in a 2nd-gear fit determination range V7, the clutchless shift phase is set to a shift completion phase as shown in FIG. 5(*c*). According to this arrangement, as shown in FIG. 5(*d*), the throttle opening-degree is set at an ordinary control throttle opening-degree, for example, at a throttle opening-degree based on an accelerator opening-degree obtained by the accelerator opening-degree sensor 28, and a clutchless down-shift operation-time control is completed.

Figure 6A:
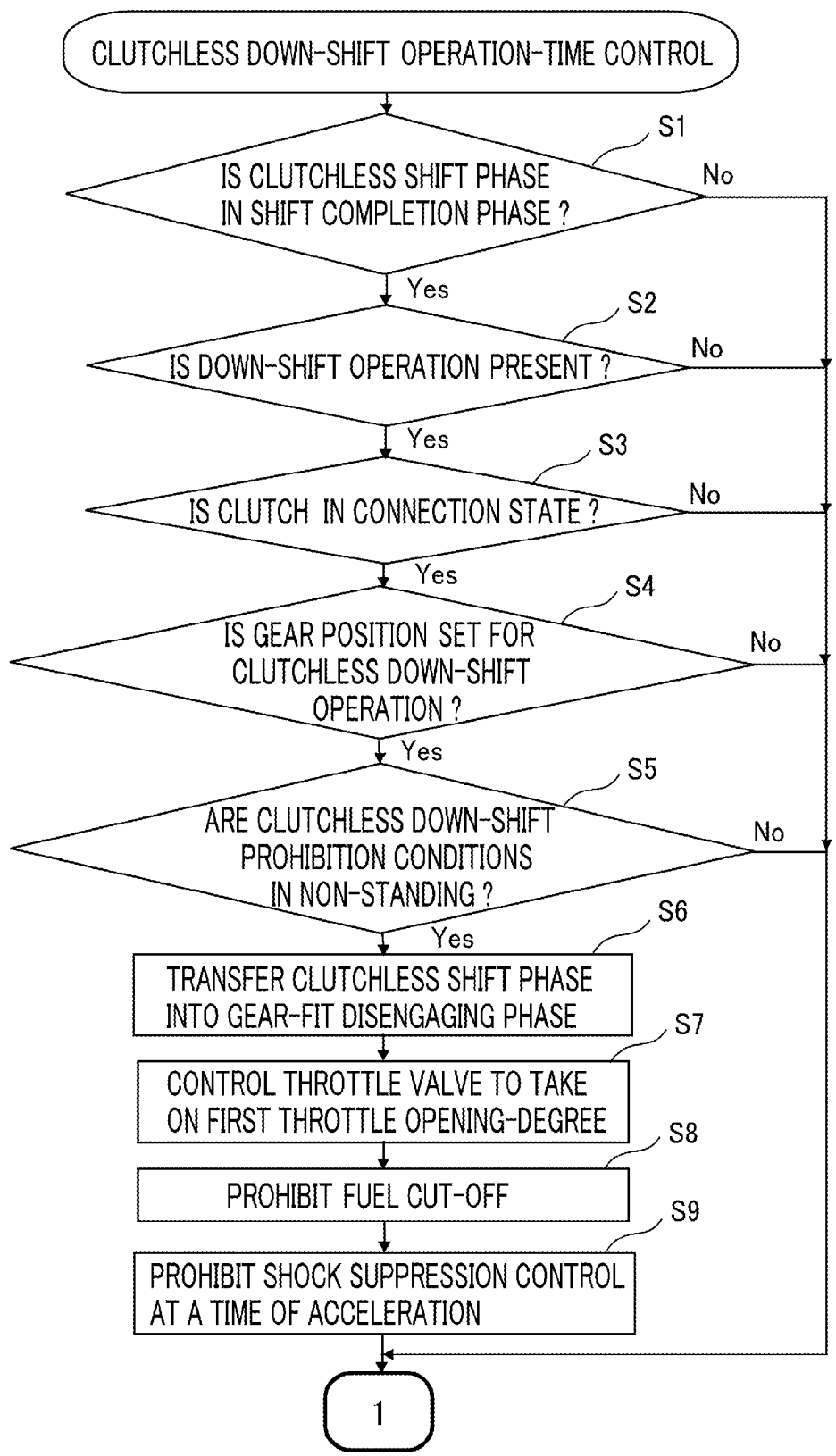
FIG. 6A is a flowchart illustrating one example of processing procedures of a control in a clutchless down-shift operation, in the motorcycle's transmission control device according to Embodiment 1 of the present invention.
Figure 6B:
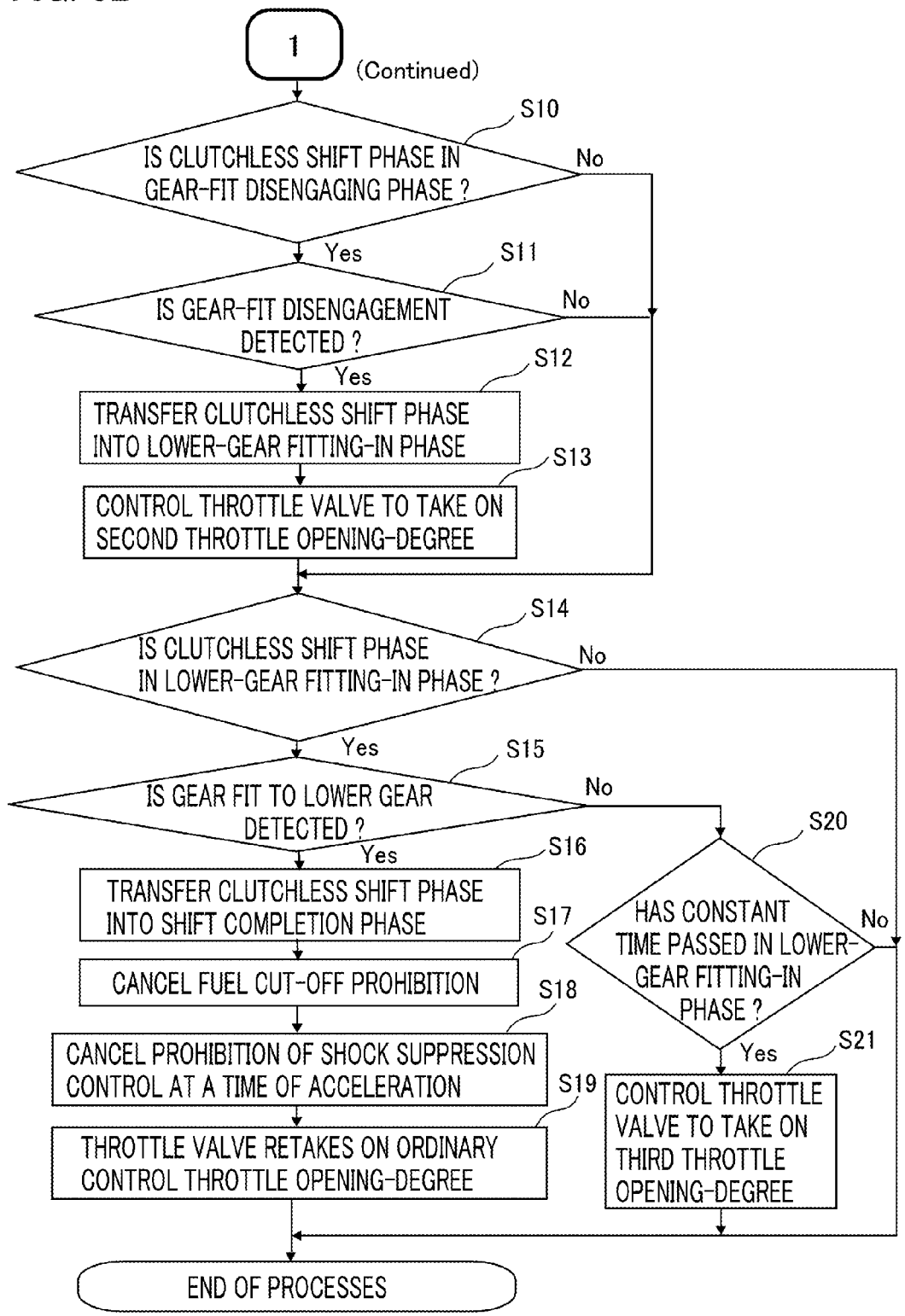
FIG. 6B is a flowchart illustrating the example in continuation of the processing procedures of the control in the clutchless down-shift operation, in the motorcycle's transmission control device according to Embodiment 1 of the present invention.

Next, the explanation will be made for an example of the clutchless down-shift operation-time control. FIGS. 6A and 6B are flowcharts illustrating one example of processing procedures of the control in a clutchless down-shift operation, in the motorcycle's transmission control device according to Embodiment 1 of the present invention. It is presumed that the overall processing including those in FIGS. 6A and 6B is performed in every predetermined control periods.

In FIGS. 6A and 6B, determination is performed at Step S1 whether or not a clutchless shift phase is in a shift completion phase, namely, in a state in which a clutchless shift is not carried out; if it is determined that the clutchless shift phase is in a shift completion phase (Yes), the processing moves to a process at Step S2. Meanwhile, as a result of the determination at Step S1, if it is determined that the clutchless shift phase is not in a shift completion phase (No), the processing moves to a process at Step S10.

At Step S2, determination is performed by the information of the down-shift switch 20*b* whether a down-shift operation by the rider is present or absent. If it is determined that a down-shift operation is present (Yes), the processing moves to a process at Step S3. If it is determined that a down-shift operation is absent (No), the processing moves to the process at Step S10.

At Step S3, determination is performed, by the information of the clutch switch 15, whether the rider does not operate the clutch lever 14 so that the clutch 13 is in a connection state. If it is determined that the clutch 13 is in a connection state (Yes), the processing moves to a process at Step S4. If it is determined that the clutch 13 is in a disconnection state (No), the processing moves to the process at Step S10.

At Step S4, determination is performed, by the output voltage of the gear-position sensor 22, whether a gear position is set where the rider can implement a clutchless down-shift operation. If it is determined that the gear position is set where a clutchless down-shift operation can be implemented (Yes), the processing moves to a process at Step S5.

At Step S5, determination is performed whether or not clutchless down-shift prohibition conditions are in non-standing. As for the clutchless down-shift prohibition conditions referred to herein, there are the following examples.

As a first example of a clutchless down-shift prohibition condition, it is a case in which determination is performed that the vehicle is cornering; for example, it is a case in which the determination is performed by a yaw rate sensor so that the vehicle is cornering, or a case in which the determination is performed by detecting that, using a tilt angle sensor, the vehicle is tilting in a left-hand or right-hand direction so that the vehicle is cornering, or a case in which the determination is performed that the vehicle is cornering when there exists difference of speeds from vehicle speed sensors attached on the front and rear wheels. In these cases, if a clutchless down-shift operation is permitted, it is feared that the vehicle becomes unstable, so that a rollover or an accident is caused; therefore, a clutchless down-shift is prohibited.

As a second example of a clutchless down-shift prohibition condition, it is a case in which determination is performed that grip of tire-wheels is in a state being lowered because an engine's output is larger at a time of acceleration; for example, it is a case in which the determination is performed by vehicle speed sensors attached on the front and rear wheels so that a rear wheel speed is detected which is increasing in comparison with a front wheel speed, or a case in which a grip-reduction prevention control therefor is in operation. In these cases, if a clutchless down-shift operation is permitted, it is feared that the operation induces further lowering the grip, and the vehicle becomes unstable, so that a rollover or an accident is caused; therefore, a clutchless down-shift is prohibited.

As a third example of a clutchless down-shift prohibition condition, it is a case in which determination is performed that grip of tire-wheels is in a state being lowered because engine braking at the time of deceleration is excessively working; for example, it is a case in which the determination of the grip being lowered is performed by vehicle speed sensors attached on the front and rear wheels so that a rear wheel speed is detected which is decreasing in comparison with a front wheel speed, or a case in which a grip-reduction prevention control therefor is in operation. In these cases, if a clutchless down-shift operation is permitted, it is feared that the operation induces further lowering the grip, and the vehicle becomes unstable, so that a rollover or an accident is caused; therefore, a clutchless down-shift is prohibited.

As a fourth example of a clutchless down-shift prohibition condition, it is a case in which determination is made that an ABS control, which prevents tire-wheel lockup, is in operation at the time of braking operation. If a clutchless down-shift operation is permitted, it is feared that the operation induces unintended tire-wheel lockup, and the vehicle becomes unstable, so that a rollover or an accident is caused; therefore, a clutchless down-shift is prohibited.

As a fifth example of a clutchless down-shift prohibition condition, it is a case in which determination is performed that the front wheel is in a state of being levitated because an engine's output is larger at a time of acceleration; for example, it is a case in which the determination of the front wheel levitation is performed by vehicle speed sensors attached on the front and rear wheels so that a front wheel speed is detected which is decreasing in comparison with a rear wheel speed, or a case in which the determination of the front wheel levitation is performed by detecting it using a stroke sensor(s) so that strokes of suspension is extended. In these cases, if a clutchless down-shift operation is permitted, it is feared that the operation induces unintended acceleration, and the vehicle becomes unstable, so that a rollover or an accident is caused; therefore, a clutchless down-shift is prohibited.

At Step S5, if it is determined that all of the clutchless down-shift prohibition conditions are in non-standing (Yes), the clutchless shift phase is transferred to a gear-fit disengaging phase at Step S6.

Next, the processing moves to a process at Step S7, and the throttle valve 5 is controlled to take on a first throttle opening-degree. Next, at Step S8, fuel cut-off is prohibited. Next, at Step S9, a shock suppression control at the time of acceleration is prohibited to be performed; for example, an ignition retard control at the time of acceleration, a gradually increasing control of the throttle opening-degree, and the like are prohibited, and the processing moves to Step S10. Note that, as the occasion requires, compensation of the throttle opening-degree and compensation of the ignition-timing, which do not relate to the control in the clutchless down-shift operation and give changes to an engine's output, are held without giving them changes during the clutchless down-shift operation.

Meanwhile, at Step S5, if it is determined that the clutchless down-shift prohibition conditions are in standing (No), an engine's output is not changed by moving to the process at Step S10. Accordingly, because contact pressure of gears' dogs and dog holes is maintained, a state is achieved in which the gear fit cannot be disengaged by only the rider's shift pedal operation.

At Step S10, determination is performed whether or not the clutchless shift phase is in a gear-fit disengaging phase; and if it is determined that the clutchless shift phase is in a gear-fit disengaging phase, namely, in a state in which disengagement of a fit of current gears is performed by a down-shift operation (Yes), the processing moves to a process at Step S11. If it is determined that the clutchless shift phase is not in a gear-fit disengaging phase (No), the processing moves to Step S14.

At Step S11, determination is performed whether or not gear-fit disengagement is detected. If gear-fit disengagement is detected (Yes), the processing moves to a process at Step S12; and it is determined that the clutchless shift phase is in a lower-gear fitting-in phase, namely, in a state in which a gear fit is performed toward a lower gear by the down-shift operation. Next, in a process at Step S13, the throttle valve 5 is controlled to take on a second throttle opening-degree, and the processing moves to Step S14.

Meanwhile, at Step S10, if it is determined that gear-fit disengagement is not yet detected (No), the processing moves to a process at Step S14.

At Step S14, determination is performed whether or not the clutchless shift phase is in a lower-gear fitting-in phase.

If it is determined that the clutchless shift phase is in a lower-gear fitting-in phase (Yes), the processing moves to a process at Step S15. If it is determined that the clutchless shift phase is not in a lower-gear fitting-in phase (No), the clutchless down-shift operation-time control is ended.

At Step S15, determination is performed whether or not a gear fit to a lower gear is detected. If it is determined that a gear fit to a lower gear is detected (Yes), the clutchless shift phase is transferred to a shift completion phase at Step S16. Next, at Step S17, fuel cut-off prohibition is canceled. Next, at Step S18, prohibition of a shock suppression control at the time of acceleration is canceled. Next, at Step S19, the throttle valve 5 retakes on an ordinary control throttle opening-degree, and the clutchless down-shift operation-time control is ended.

Meanwhile, at Step S15, if it is determined that a gear mesh to a lower gear is not detected (No), the processing moves to a process at Step S20.

At Step S20, determination is performed whether or not a predetermined time has passed in the lower-gear fitting-in phase. If it is determined that a predetermined time has passed in the lower-gear fitting-in phase (Yes), the throttle valve 5 is controlled to take on a third throttle opening-degree at Step S21, and the clutchless down-shift operation-time control is ended. At Step S20, if it is determined that a predetermined time has not passed after taking on the lower-gear fitting-in phase (No), the clutchless down-shift operation-time control is ended.

Here, the explanation will be made for an example of the control in a clutchless down-shift operation in which a gear fit to a lower gear is not detected for a predetermined time after the gear-fit disengagement at Step S20. FIG. 7 is an illustrative diagram for explaining the states of an output voltage of the gear-position sensor, a throttle opening-degree, an engine's rotational speed, etc. when a third throttle opening-degree is used in a clutchless down-shift operation, in the motorcycle's transmission control device according to Embodiment 1 of the present invention; the vertical axis of FIG. 7(a) designates a state of the shift switch, the vertical axis of FIG. 7(b), an output voltage of the gear-position sensor, the vertical axis of FIG. 7(c), a clutchless shift phase, the vertical axis of FIG. 7(d), a throttle opening-degree, and the vertical axis of FIG. 7(e), an engine's rotational speed; and each of the horizontal axes designates time. The processes at a time t1 and a time t2 are the same as those in FIG. 5.

In FIG. 7, when at a time t3 the output voltage of the gear-position sensor 22 shown in FIG. 7(b) does not become a 2nd-gear fit determination range V7, a throttle opening-degree is controlled to a third throttle opening-degree as shown in FIG. 7(d). The time from the time t2 to the time t3 is set for a time (in the degree of 100 [ms]), to a degree in which the vehicle is decelerated because of a continued state of gear-fit disengagement, and the vehicle does not become unstable. In addition, the third throttle opening-degree is set toward an opening side to a degree more than that of a second throttle opening-degree when a drive-wheel-part rotational speed is increased more than that at a shift start time, and the third throttle opening-degree is set toward a closing side to a degree more than that of the second throttle opening-degree when a drive-wheel-part rotational speed is lowered less than that at the shift start time.

Accordingly, when at the time t4 the rider performs a mesh to next gears, synchronization between the engine's rotational speed and the drive-wheel-part rotational speed is achieved, so that the gear fit can be smoothly achieved as shown in FIG. 7(e). As a result, the output voltage of the gear-position sensor 22 shown in FIG. 7(b) becomes in a 2nd-gear fit determination range V7, so that the clutchless shift phase is set to a shift completion phase as shown in FIG. 7(c). Lastly, the throttle opening-degree is set at an ordinary control throttle opening-degree as shown in FIG. 7(d), and the clutchless down-shift operation-time control is completed.

Next, the explanation will be made for examples when a second throttle opening-degree and a third throttle opening-degree are compensated or changed over in accordance with a running state of the vehicle.

As a first example in a case in which a second throttle opening-degree and a third throttle opening-degree are compensated or changed over in accordance with a running state of the vehicle, the explanation will be made for an example when a gear ratio of the vehicle is changed. At the time of the running, gears' reduction-ratio learning is performed by comparing an engine's rotational speed with a drive-wheel-part rotational speed. If it is determined that a reduction ratio of gears has changes more or less than a value(s) defined in advance, the second throttle opening-degree and the third throttle opening-degree are compensated in accordance with a reduction ratio having learned. When a reduction ratio of gears is smaller than a value set in advance, the drive-wheel-part rotational speed becomes lower, so that the second throttle opening-degree and the third throttle opening-degree are compensated toward a closing side. When the reduction ratio of gears is larger than a value set in advance, the drive-wheel-part rotational speed becomes higher, so that the second throttle opening-degree and the third throttle opening-degree are compensated toward an opening side.

Here, the explanation will be made for the control in a clutchless down-shift operation in which the reduction ratio of gears is smaller than a value set in advance. FIG. 8 is an illustrative diagram for explaining the states of an output voltage of the gear-position sensor, a throttle opening-degree, an engine's rotational speed, etc. in a case in which a clutchless down-shift is performed when a reduction ratio of gears is changed, in the motorcycle's transmission control device according to Embodiment 1 of the present invention; the vertical axis of FIG. 8(a) designates a state of the shift switch, the vertical axis of FIG. 8(b), an output voltage of the gear-position sensor, the vertical axis of FIG. 8(c), a clutchless shift phase, the vertical axis of FIG. 8(d), a throttle opening-degree, and the vertical axis of FIG. 8(e), an engine's rotational speed; and each of the horizontal axes designates time. The processes at a time t1 and a time t2 are the same as those in FIG. 5.

In FIG. 8, when at the time t2 a second throttle opening-degree is set, and in a case in which a reduction ratio of gears is smaller than a value set in advance, the drive-wheel-part rotational speed is lowered as shown in FIG. 8(e), so that it is required to compensate the second throttle opening-degree toward a closing side as shown in FIG. 8(d). Accordingly, when at a time t3 the rider makes a fit to next gears, synchronization between the engine's rotational speed and the drive-wheel-part rotational speed is achieved as shown in FIG. 8(e), so that the gear fit can be smoothly achieved. As a result, the output voltage of the gear-position sensor 22 shown in FIG. 8 (b) becomes in a 2nd-gear fit determination range V7, so that the clutchless shift phase is set to a shift completion phase as shown in FIG. 8(c). Lastly, the throttle opening-degree is set at an ordinary control throttle opening-degree as shown in FIG. 8(d), and the clutchless down-shift operation-time control is completed.

Next, as a second example in a case in which a second throttle opening-degree and a third throttle opening-degree are compensated or changed over in accordance with a running state of the vehicle, the explanation will be made for the control in a clutchless down-shift operation when a brake(s) is operated. When it is detected that the rider is in a braking operation, for example, when the detection is made by a brake-switch which is turned "ON" due to the braking operation, a reduction of the drive-wheel-part rotational speed is predicted so that the second throttle opening-degree and the third throttle opening-degree are compensated toward a closing side.

Here, the explanation will be made for the control in a clutchless down-shift operation when the rider performs a braking operation. FIG. 9 is an illustrative diagram for explaining the states of an output voltage of the gear-position sensor, a throttle opening-degree, an engine's rotational speed, etc. when a braking operation is performed during a clutchless down-shift, in the motorcycle's transmission control device according to Embodiment 1 of the present invention; the vertical axis of FIG. 9(a) designates a state of the shift switch, the vertical axis of FIG. 9 (b), an output voltage of the gear-position sensor, the vertical axis of FIG. 9(c), a clutchless shift phase, the vertical axis of FIG. 9(d), a throttle opening-degree, the vertical axis of FIG. 9(e), an engine's rotational speed, and the vertical axis of FIG. 9(f), a state of a brake-switch; and each of the horizontal axes designates time. The processes at a time t1 and a time t2 are the same as those in FIG. 5.

In FIG. 9, when at a time t3 a brake-switch "ON" is detected by a braking operation as shown in FIG. 9(f), a reduction of the drive-wheel-part rotational speed such as the one shown in FIG. 9(e) is predicted, and a second throttle opening-degree is compensated toward a closing side as shown in FIG. 9(d). Accordingly, when at a time t4 the rider makes a fit to next gears, synchronization between the engine's rotational speed and the drive-wheel-part rotational speed can be achieved as shown in FIG. 9(e), so that the gear mesh can be smoothly achieved. As a result, the output voltage of the gear-position sensor 22 becomes in a 2nd-gear fit determination range V7 as shown in FIG. 9(b), so that the clutchless shift phase is set to a shift completion phase as shown in FIG. 9(c). Lastly, the throttle opening-degree is set at an ordinary control throttle opening-degree as shown in FIG. 9(d), and the clutchless down-shift operation-time control is completed.

Next, as a third example in a case in which a second throttle opening-degree and a third throttle opening-degree are compensated or changed over in accordance with a running state of the vehicle, the explanation will be made for the control in a clutchless down-shift operation in the course of running hills with slopes. When detection is made so that the vehicle is running hills with slopes, for example, when the detection is made by a tilt angle sensor so that the vehicle is tilting fore and aft: when detection is made for an ascending slope, a reduction of the drive-wheel-part rotational speed is predicted so that the second throttle opening-degree and the third throttle opening-degree are compensated toward a closing side; and when detection is made for a descending slope, a reduction of the drive-wheel-part rotational speed is predicted so that the second throttle opening-degree and the third throttle opening-degree are compensated toward an opening side.

Here, the explanation will be made for the control in a clutchless down-shift operation in which the vehicle is running on an ascending slope. FIG. 10 is an illustrative diagram for explaining the states of an output voltage of the gear-position sensor, a throttle opening-degree, an engine's rotational speed, etc. when a clutchless down-shift is performed during an ascending slope running, in the motorcycle's transmission control device according to Embodiment 1 of the present invention; the vertical axis of FIG. 10(a) designates a state of the shift switch, the vertical axis of FIG. 10(b), an output voltage of the gear-position sensor, the vertical axis of FIG. 10(c), a clutchless shift phase, the vertical axis of FIG. 10(d), a throttle opening-degree, the vertical axis of FIG. 10(e), an engine's rotational speed, and the vertical axis of FIG. 10 (f), an output voltage of a tilt angle sensor; and each of the horizontal axes designates time. The processes at a time t1 and a time t2 are the same as those in FIG. 5.

In FIG. 10, if it is determined at a time t3 that the vehicle is running on an ascending slope by a tilt angle sensor as shown in FIG. 10(f), a reduction of the drive-wheel-part rotational speed is predicted such as the one shown in FIG. 10(e), and a second throttle opening-degree is compensated toward a closing side as shown in FIG. 10(d). Accordingly, when at a time t4 the rider makes a fit to next gears, synchronization between the engine's rotational speed and the drive-wheel-part rotational speed can be achieved as shown in FIG. 10(e), so that the gear mesh can be smoothly achieved. As a result, the output voltage of the gear-position sensor 22 shown in FIG. 10(b) becomes in a 2nd-gear fit determination range V7, so that the clutchless shift phase is set to a shift completion phase as shown in FIG. 10(c). Lastly, the throttle opening-degree is set at an ordinary control throttle opening-degree as shown in FIG. 10(d), and the clutchless down-shift operation-time control is completed.

Next, as a fourth example in a case in which a second throttle opening-degree and a third throttle opening-degree are compensated or changed over in accordance with a running state of the vehicle, the explanation will be made for the control in a clutchless down-shift operation when it is determined by information of a navigation system that the vehicle is running on the road with many curves. When it is determined that by information of a navigation system that the vehicle is running on the road with many curves, the second throttle opening-degree is set, in order to prevent the vehicle from becoming unstable due to shift shock, to the degree of opening so that an engine's rotational speed becomes lower than the drive-wheel-part rotational speed, and the degree of opening is gradually increased to the third throttle opening-degree so that the engine's rotational speed becomes a drive-wheel-part rotational speed when a predetermined time has passed.

Here, the explanation will be made for the control in a clutchless down-shift operation when the vehicle runs on the road with many curves. FIG. 11 is an illustrative diagram for explaining the states of an output voltage of the gear-position sensor, a throttle opening-degree, an engine's rotational speed, etc. in a case in which a clutchless down-shift is performed when a navigation system determines the road with many curves, in the motorcycle's transmission control device according to Embodiment 1 of the present invention; the vertical axis of FIG. 11(a) designates a state of the shift switch, the vertical axis of FIG. 11(b), an output voltage of the gear-position sensor, the vertical axis of FIG. 11(c), a clutchless shift phase, the vertical axis of FIG. 11(d), a throttle opening-degree, and the vertical axis of FIG. 11(e), an engine's rotational speed; and each of the horizontal axes designates time. The processes at a time t1 and a time t2 are the same as those in FIG. 5.

In FIG. 11, a second throttle opening-degree is set at a time t3 for the road with many curves as shown in FIG. 11(d). Here, the second throttle opening-degree is set at the degree of opening so that an engine's rotational speed becomes lower than the drive-wheel-part rotational speed. At a time t4 when a predetermined time has passed, the degree of throttle opening-degree is gradually increased toward a third throttle opening-degree for the road with many curves. Here, as the predetermined time, a time is defined so that an engine's rotational speed reaches a targeted engine's rotational speed (in the degree of 50 [msec]). Accordingly, when at the time t4 the rider performs a mesh to next gears, synchronization between the engine's rotational speed and the drive-wheel-part rotational speed can be achieved as shown in FIG. 11(*e*), so that the gear fit can be smoothly achieved. As a result, the output voltage of the gear-position sensor 22 shown in FIG. 11(*b*) becomes in a 2nd-gear fit determination range V7, so that the clutchless shift phase is set to a shift completion phase as shown in FIG. 11(*c*). Lastly, the throttle opening-degree is set at the third throttle opening-degree as shown in FIG. 11(*d*), and the clutchless down-shift operation-time control is completed.

Next, as a fifth example in a case in which a second throttle opening-degree and a third throttle opening-degree are compensated or changed over in accordance with a running state of the vehicle, the explanation will be made for the control in a clutchless down-shift operation when the vehicle is cornering. When it is detected that the vehicle is cornering, for example, when it is determined by a yaw rate sensor that the vehicle is cornering, or it is determined by detecting that, using a tilt angle sensor, the vehicle is tilting in a left-hand or right-hand direction so that the vehicle is cornering, or it is determined that the vehicle is cornering when there exists difference of speeds from vehicle speed sensors attached on the front and rear wheels, the second throttle opening-degree is set, in order to prevent the vehicle from becoming unstable due to shift shock, to the degree of opening so that an engine's rotational speed becomes lower than the drive-wheel-part rotational speed, and the degree of opening is gradually increased to the third throttle opening-degree so that the engine's rotational speed becomes a drive-wheel-part rotational speed when a predetermined time has passed. Note that, the control in the clutchless down-shift operation is equivalent to that in FIG. 11, when the determination is performed that the vehicle is cornering.

As a sixth example in a case in which a second throttle opening-degree and a third throttle opening-degree are compensated or changed over in accordance with a running state of the vehicle, the explanation will be made for a clutchless down-shift operation-time control when grip of tire-wheels is in a state being lowered because an engine's output is larger at a time of acceleration. When determination is performed that grip of tire-wheels is in a state being lowered because an engine's output is larger at a time of acceleration; for example, it is a case in which the determination is performed by vehicle speed sensors attached on the front and rear wheels so that a rear wheel speed is detected which is increasing in comparison with a front wheel speed, or a case in which a grip-reduction prevention control therefor is in operation, the second throttle opening-degree is set, in order to prevent the vehicle from becoming unstable due to shift shock, to the degree of opening so that an engine's rotational speed becomes lower than the drive-wheel-part rotational speed, and the degree of opening is gradually increased to the third throttle opening-degree so that the engine's rotational speed becomes a drive-wheel-part rotational speed when a predetermined time has passed. Note that, the control in a clutchless down-shift operation is equivalent to that in FIG. 11, when the determination is performed that grip of tire-wheels is in a state being lowered because an engine's output is larger at the time of acceleration.

Moreover, as a seventh example in a case in which a second throttle opening-degree and a third throttle opening-degree are compensated or changed over in accordance with a running state of the vehicle, the explanation will be made for a clutchless down-shift operation-time control when grip of tire-wheels is in a state being lowered because engine braking at the time of deceleration is excessively working. When determination is performed that grip of tire-wheels is in a state being lowered because engine braking at the time of deceleration is excessively working; for example, the determination of the grip being lowered is performed by vehicle speed sensors attached on the front and rear wheels so that a rear wheel speed is detected which is decreasing in comparison with a front wheel speed, or a case in which a grip-reduction prevention control therefor is operating, the second throttle opening-degree is set, in order to prevent the vehicle from becoming unstable due to shift shock, to the degree of opening so that an engine's rotational speed becomes lower than the drive-wheel-part rotational speed, and the degree of opening is gradually increased to the third throttle opening-degree so that the engine's rotational speed becomes a drive-wheel-part rotational speed when a predetermined time has passed. Note that, the control in a clutchless down-shift operation is equivalent to that in FIG. 11, when the determination is performed that grip of tire-wheels is in a state being lowered because engine braking at the time of deceleration is excessively working.

Next, as an eighth example in a case in which a second throttle opening-degree and a third throttle opening-degree are compensated or changed over in accordance with a running state of the vehicle, the explanation will be made for a clutchless down-shift operation-time control when an ABS control, which prevents tire-wheel lockup, is in operation at the time of braking operation by the rider. When an ABS control, which prevents tire-wheel lockup, is in operation at the time of braking operation by the rider, the second throttle opening-degree is set, in order to prevent the vehicle from becoming unstable due to shift shock, to the degree of opening so that an engine's rotational speed becomes lower than the drive-wheel-part rotational speed, and the degree of opening is gradually increased to the third throttle opening-degree so that the engine's rotational speed becomes a drive-wheel-part rotational speed when a predetermined time has passed. Note that, the control in a clutchless down-shift operation is equivalent to that in FIG. 11 when an ABS control is in operation.

As a ninth example in a case in which a second throttle opening-degree and a third throttle opening-degree are compensated or changed over in accordance with a running state of the vehicle, the explanation will be made for a control in a clutchless down-shift operation when the front wheel is in a state of being levitated because an engine's output is larger at a time of acceleration. When determination is performed that the front wheel is in a state of being levitated because an engine's output is larger at a time of acceleration; for example, the determination of the front wheel levitation is performed by vehicle speed sensors attached on the front and rear wheels so that a front wheel speed is detected which is decreasing in comparison with a rear wheel speed, or a case in which the determination of the front wheel levitation is performed by detecting it using a stroke sensor(s) so that strokes of suspension is extended, the second throttle opening-degree is set, in order to prevent the vehicle from becoming unstable due to shift shock, to the degree of opening so that an engine's rotational speed becomes lower than the drive-wheel-part rotational speed, and the degree of opening is gradually increased to the third throttle opening-degree so that the engine's rotational speed becomes a drive-wheel-part rotational speed when a predetermined time has passed. Note that, the control in the clutchless down-shift operation is equivalent to that in FIG. 11, when the determination of the front wheel levitation is performed.

Next, as a tenth example in a case in which a second throttle opening-degree and a third throttle opening-degree are compensated or changed over in accordance with a running state of the vehicle, the explanation will be made for a clutchless down-shift operation-time control in a vehicle equipped with a mode select which can select a sports mode in which an engine's output functions with respect to an accelerator operation with good responsivity according to preferences of the rider, an urban mode in which an engine's output responds gradually even with a rough accelerator operation, a normal mode in which a comfortable running is possible even in various operating states, and the like.

When a sports mode is selected, it is so arranged that the down-shift can be implemented in a short time even if shift shock is produced to a certain extent: by setting a second throttle opening-degree to the degree of opening so that an engine's rotational speed becomes higher than the drive-wheel-part rotational speed, a rise of the engine's rotational speed is made faster; and, by setting the third throttle opening-degree so that the engine's rotational speed becomes a drive-wheel-part rotational speed when a predetermined time has passed, it is so arranged that the engine's rotational speed converges to a targeted engine's rotational speed. According to the arrangement, a time from gear-fit disengagement until a fit to next gears is shortened.

When an urban mode is selected, it is so arranged that shift shock can be mitigated: by setting a second throttle opening-degree to the degree of opening so that an engine's rotational speed becomes lower than the drive-wheel-part rotational speed, and by gradually increasing the degree of opening to a third throttle opening-degree so that the engine's rotational speed becomes a drive-wheel-part rotational speed when a predetermined time has passed, synchronization between the engine's rotational speed and the drive-wheel-part rotational speed is smoothly performed, and shift shock can be mitigated which is produced because an output torque of the engine is excessively large when the rider makes a fit to next gears.

Figure 12:
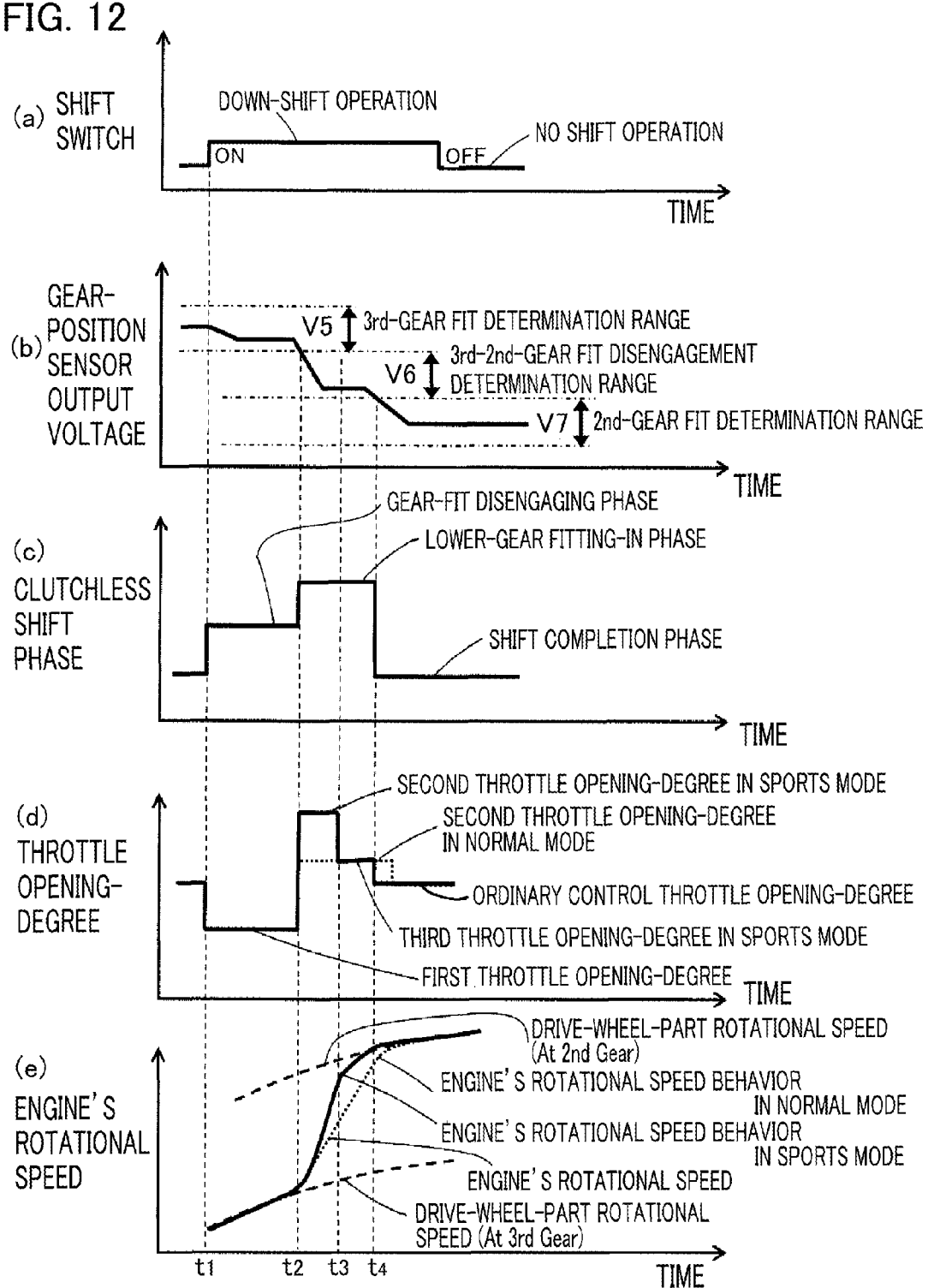
FIG. 12 is an illustrative diagram for explaining the states of an output voltage of the gear-position sensor, a throttle opening-degree, an engine's rotational speed, etc. in a case in which a clutchless down-shift is performed when the rider selects a sports mode by a mode select, in the motorcycle's transmission control device according to Embodiment 1 of the present invention.

Here, the explanation will be made for the control in a clutchless down-shift operation when the rider selects a sports mode. FIG. 12 is an illustrative diagram for explaining the states of an output voltage of the gear-position sensor, a throttle opening-degree, an engine's rotational speed, etc. in a case in which a clutchless down-shift is performed when the rider selects a sports mode by a mode select, in the motorcycle's transmission control device according to Embodiment 1 of the present invention; the vertical axis of FIG. 12(a) designates a state of the shift switch, the vertical axis of FIG. 12(b), an output voltage of the gear-position sensor, the vertical axis of FIG. 12(c), a clutchless shift phase, the vertical axis of FIG. 12(d), a throttle opening-degree, and the vertical axis of FIG. 12(e), an engine's rotational speed; and each of the horizontal axes designates time. The processes at a time t1 and a time t2 are the same as those in FIG. 5.

In FIG. 12, at the time t2, a second throttle opening-degree is set to the degree of opening so that an engine's rotational speed becomes higher than the drive-wheel-part rotational speed as shown in FIG. 12(d). Accordingly, a rise of the engine's rotational speed is made faster. At a time t3, the throttle opening-degree is set at a third throttle opening-degree. The time from the time t2 to the time t3 is set for a degree in which an engine's rotational speed does not reach a drive-wheel-part rotational speed (in the degree of 30 [ms]). Accordingly, when at a time t4 the rider makes a fit to next gears, synchronization between the engine's rotational speed and the drive-wheel-part rotational speed can be achieved as shown in FIG. 12(e), so that the down-shift can be implemented in a short time, even if shift shock is produced to a certain extent at a time of a gear mesh. As a result, the output voltage of the gear-position sensor 22 shown in FIG. 12(b) becomes in a 2nd-gear fit determination range V7, so that the clutchless shift phase is set to a shift completion phase as shown in FIG. 12(c). Lastly, the throttle opening-degree is set at an ordinary control throttle opening-degree as shown in FIG. 12(d), and the clutchless down-shift operation-time control is completed.

Note that, the control in a clutchless down-shift operation is equivalent to that in FIG. 11 when the rider selects an urban mode.

It should be noted that, while the present invention has been shown and described in detail, the foregoing description is in all aspects illustrative and not restrictive. It is therefore understood that, in the present invention, the embodiments can be appropriately modified and/or eliminated without departing from the scope of the invention.

The motorcycle's transmission control device in Embodiment 1 of the present invention described above gives a concrete form to the invention(s) described below.

(1) A transmission control device of a motorcycle comprises:
a manual transmission including a plurality of shift gears for transmitting an output of an engine mounted on the motorcycle to a drive wheel of the motorcycle;
a shift operation unit operated by a rider of the motorcycle, for controlling a selection of the plurality of shift gears and a fit between shift gears being selected, and for performing an up-shift operation or a down-shift operation of the manual transmission;
a shift-operation detection unit for detecting a state of an up-shift operation or a down-shift operation performed by the shift operation unit;
a gear-position determination unit for detecting a state of a selection of the shift gears, and a state of a fit between shift gears being selected;
a clutch mounted between the engine and the manual transmission, for connecting or disconnecting between the engine and the manual transmission by an operation of the rider;
a clutch connection-state detection unit for detecting a connection state of the clutch;
a clutchless shifting unit for performing determination whether or not a clutchless down-shift operation, in which the rider achieves a down-shift operation without disconnecting the clutch based on information from the shift operation unit, the gear-position determination unit and the clutch connection-state detection unit, can be implemented, and for performing determination whether or not a fit between shift gears being selected is disengaged by the clutchless down-shift operation;
a throttle operation unit for controlling an amount of intake air into the engine by adjusting a degree of opening of a throttle valve mounted in an intake pipe of the engine;
a fuel-injection control unit for controlling an amount of fuel injection into the engine; and
an ignition-timing control unit for controlling ignition-timing of the engine, wherein the throttle operation unit controls a degree of opening of the throttle valve to become a first throttle opening-degree when the clutchless shifting unit determines that a clutchless down-shift operation can be implemented, and controls a degree of opening of the throttle valve to become a second throttle opening-degree when the clutchless shifting unit determines that a fit between shift gears being selected is disengaged by the clutchless down-shift operation.

According to the motorcycle's transmission control device in Embodiment 1 adopting the present invention, torque from the engine or a drive wheel meshed with gears is relieved by setting the throttle opening-degree at a first throttle opening-degree, so that the rider can disengage the mesh of gears in one's shift pedal operation; and, by setting the throttle opening-degree at the second throttle opening-degree, the engine output can be adjusted so that an engine's rotational speed is synchronized with a drive-wheel-part rotational speed, enabling the rider to mesh to next gears.

(2) The transmission control device of a motorcycle as set forth in (1) described above is characterized in that the second throttle opening-degree is set larger than the first throttle opening-degree.

According to the motorcycle's transmission control device in Embodiment 1 adopting the present invention, the second throttle opening-degree is set, in a direction to open the throttle valve, more than the first throttle opening-degree, so that the throttle opening-degree can be set in following with a deceleration ratio being changed by the down-shift so that a drive-wheel-part rotational speed becomes higher. For this reason, at a time of a mesh to next gears, synchronization between an engine's rotational speed and the drive-wheel-part rotational speed is achieved, and the mesh of gears can be securely implemented.

(3) The transmission control device of a motorcycle as set forth in (1) or (2) described above is characterized in that the throttle operation unit controls a degree of opening of the throttle valve to become a third throttle opening-degree, when a fit to next shift gears is not detected for a predetermined time after the clutchless shifting unit determines that a fit between current shift gears is disengaged by a clutchless down-shift operation of the rider.

According to the motorcycle's transmission control device in Embodiment 1 adopting the present invention, an engine's output can be readjusted by setting the degree of opening of the throttle valve at the third throttle opening-degree even when a vehicle speed changes (deceleration due to an ascending slope, acceleration due to a descending slope, etc.) from that at a shift start time, and a "gear mesh" cannot be achieved because an engine's rotational speed and a drive-wheel-part rotational speed do not synchronize with each other. Accordingly, synchronization between the engine's rotational speed and the drive-wheel-part rotational speed is achieved, and a gear mesh to next gears can be performed. As for another use, when the rider desires a quick shift operation, even allowing shift shock to a certain extent because of joining to a race or the like, the second throttle opening-degree is set so that an engine's rotational speed after a down-shift becomes higher than the drive-wheel-part rotational speed, and the third throttle opening-degree is set so that the engine's rotational speed becomes a drive-wheel-part rotational speed after the down-shift when a predetermined time has passed. Accordingly, a rise of the engine's rotational speed is made faster at the second throttle opening-degree, and the engine's rotational speed converges to a drive-wheel-part rotational speed at the third throttle opening-degree, so that a time from gear mesh disengagement until achieving a mesh to next gears is shortened. As for yet another use, when the rider desires to reduce shift shock as much as possible because of an urban running, a rainy day running and the like, the second throttle opening-degree is set so that an engine's rotational speed after a down-shift becomes lower than the drive-wheel-part rotational speed, and the degree of opening is gradually increased to the third throttle opening-degree so that the engine's rotational speed becomes a drive-wheel-part rotational speed after the down-shift when a predetermined time has passed. Accordingly, while preventing the shift time to become longer, it is possible to mitigate shift shock which is produced because an output torque of the engine is excessively large at a time of the mesh to next gears.

(4) The transmission control device of a motorcycle as set forth in (1) or (2) described above is characterized in that, when the clutchless shifting unit determines that a clutchless down-shift operation can be implemented and in a case in which the fuel-injection control unit halts fuel injection to the engine, the fuel-injection control unit resumes the fuel injection during the clutchless down-shift operation.

According to the motorcycle's transmission control device in Embodiment 1 adopting the present invention, when the clutchless shifting unit determines that a clutchless down-shift operation can be implemented and in a case in which the fuel-injection control unit halts fuel injection to the engine, the fuel-injection control unit resumes the fuel injection during the clutchless down-shift operation, so that, even when a fuel-injection halt control or the like is performed at the time of deceleration, the fuel injection can be resumed, enabling changes in an engine's output, and thus a clutchless down-shift operation can be implemented.

(5) The transmission control device of a motorcycle as set forth in (1) or (2) described above is characterized in that, when the clutchless shifting unit determines that a clutchless down-shift operation can be implemented, the throttle operation unit holds a control state so that, during the clutchless down-shift operation, implementation of a throttle control is not performed, nor a change to a degree of opening of the throttle valve is not given, either of which becomes a disturbance to the clutchless down-shift operation.

According to the motorcycle's transmission control device in Embodiment 1 adopting the present invention, when the clutchless shifting unit determines that a clutchless down-shift operation can be implemented, the throttle operation unit holds a control state so that, during the clutchless down-shift operation, implementation of a throttle control is not performed, nor a change to the throttle opening-degree is not given, either of which becomes a disturbance to the clutchless down-shift operation, so that it is possible to achieve an intended degree of opening in the clutchless down-shift operation while securing responsivity of the throttle, and to promptly obtain a targeted engine's output. Accordingly, it is possible to mitigate a case in which a hook or clinch is felt at a time of the rider's gear mesh disengagement, and a case in which shift shock is produced owing to lack of torque at the time of a next gear mesh.

(6) The transmission control device of a motorcycle as set forth in (1) or (2) described above is characterized in that, when the clutchless shifting unit determines that a clutchless down-shift operation can be implemented, the ignition-timing control unit holds a control state so that, during the clutchless down-shift operation, implementation of an ignition-timing control is not performed, nor a change to ignition-timing is not given, either of which becomes a disturbance to the clutchless down-shift operation.

According to the motorcycle's transmission control device in Embodiment 1 adopting the present invention, when the clutchless shifting unit determines that a clutchless down-shift operation can be implemented, the ignition-timing control unit holds a control state so that, during the clutchless down-shift operation, implementation of an ignition-timing control is not performed, nor a change to ignition-timing is not given, either of which becomes a disturbance to the clutchless down-shift operation, so that it is possible to secure responsivity of an engine's output in the clutchless down-shift operation, and to promptly obtain a targeted engine's output. Accordingly, it is possible to mitigate a case in which a hook or clinch is felt at a time of the rider's gear mesh disengagement, and a case in which shift shock is produced owing to lack of torque at the time of a next gear mesh.

EXPLANATION OF NUMERALS AND SYMBOLS

Numeral "1" designates an engine; "2," control unit; "3," injector; "4," intake pipe; "5," throttle valve; "6," throttle control motor; "7," throttle position sensor; "8," spark plug; "9," ignition coil; "10," crankshaft; "11," crankshaft angle sensor; "12," primary reduction mechanism; "13," clutch; "14," clutch lever; "15," clutch switch; "16," manual transmission; "17," main shaft; "17a," "17a1," "17a2," main shaft gear; "17a2d," "18a1d," dog; "17a1h," "18a2h," dog hole; "18," counter shaft; "18a," "18a1," "18a2," counter shaft gear; "19," shift pedal; "20," shift switch; "20a," up-shift switch; "20b," down-shift switch; "21," shift drum; "211," "212," "213," shift groove; "22," gear-position sensor; "231," "232," "233," shift fork; "24," drive chain; "25," drive wheel; "26," vehicle speed sensor; "27," accelerator grip; "271," grip portion of handlebars; "28," accelerator opening-degree sensor; "31," shift-operation detection unit; "32," gear-position determination unit; "33," clutch connection-state detection unit; "34," clutchless shifting unit; "35," throttle operation unit; "36," ignition-timing control unit; and "37," fuel-injection control unit.

What is claimed is:

1. A transmission control device of a motorcycle, comprising:
    a manual transmission including a plurality of shift gears for transmitting an output of an engine mounted on the motorcycle to a drive wheel of the motorcycle;
    a shift operation unit operated by a rider of the motorcycle, for controlling a selection of the plurality of shift gears and a fit between shift gears being selected, and for performing an up-shift operation or a down-shift operation of the manual transmission;
    a shift-operation detection unit for detecting a state of an up-shift operation or a down-shift operation performed by the shift operation unit;
    a gear-position determination unit for detecting a state of a selection of the shift gears, and a state of a fit between shift gears being selected;
    a clutch mounted between the engine and the manual transmission, for connecting or disconnecting between the engine and the manual transmission by an operation of the rider;
    a clutch connection-state detection unit for detecting a connection state of the clutch;
    a clutchless shifting unit for performing determination whether or not a clutchless down-shift operation, in which the rider achieves a down-shift operation without disconnecting the clutch based on information from the shift operation unit, the gear-position determination unit and the clutch connection-state detection unit, can be implemented, and for performing determination whether or not a fit between shift gears being selected is disengaged by the clutchless down-shift operation;
    a throttle operation unit for controlling an amount of intake air into the engine by adjusting a degree of opening of a throttle valve mounted in an intake pipe of the engine;
    a fuel-injection control unit for controlling an amount of fuel injection into the engine; and
    an ignition-timing control unit for controlling ignition-timing of the engine, wherein
    the throttle operation unit controls
    a degree of opening of the throttle valve to become a first throttle opening-degree when the clutchless shifting unit determines that a clutchless down-shift operation can be implemented, and controls
    a degree of opening of the throttle valve to become a second throttle opening-degree when the clutchless shifting unit determines that a fit between shift gears being selected is disengaged by the clutchless down-shift operation.

2. The transmission control device of a motorcycle as set forth in claim 1, wherein the second throttle opening-degree is set larger than the first throttle opening-degree.

3. The transmission control device of a motorcycle as set forth in claim 1, wherein
    the throttle operation unit controls a degree of opening of the throttle valve to become a third throttle opening-degree,
    when a fit to next shift gears is not detected for a predetermined time after the clutchless shifting unit determines that a fit between current shift gears is disengaged by a clutchless down-shift operation of the rider.

4. The transmission control device of a motorcycle as set forth in claim 1, wherein, when the clutchless shifting unit determines that a clutchless down-shift operation can be implemented and in a case in which the fuel-injection control unit halts fuel injection to the engine, the fuel-injection control unit resumes the fuel injection during the clutchless down-shift operation.

5. The transmission control device of a motorcycle as set forth in claim 1, wherein, when the clutchless shifting unit determines that a clutchless down-shift operation can be implemented, the throttle operation unit holds a control state so that, during the clutchless down-shift operation, implementation of a throttle control is not performed, nor a change to a degree of opening of the throttle valve is not given, either of which becomes a disturbance to the clutchless down-shift operation.

6. The transmission control device of a motorcycle as set forth in claim 1, wherein, when the clutchless shifting unit determines that a clutchless down-shift operation can be implemented, the ignition-timing control unit holds a control state so that, during the clutchless down-shift operation, implementation of an ignition-timing control is not performed, nor a change to ignition-timing is not given, either of which becomes a disturbance to the clutchless down-shift operation.

7. The transmission control device of a motorcycle as set forth in claim 2, wherein
    the throttle operation unit controls a degree of opening of the throttle valve to become a third throttle opening-degree, when a fit to next shift gears is not detected for a predetermined time after the clutchless shifting unit determines that a fit between current shift gears is disengaged by a clutchless down-shift operation of the rider.

8. The transmission control device of a motorcycle as set forth in claim 2, wherein, when the clutchless shifting unit determines that a clutchless down-shift operation can be implemented and in a case in which the fuel-injection control unit halts fuel injection to the engine, the fuel-injection control unit resumes the fuel injection during the clutchless down-shift operation.

9. The transmission control device of a motorcycle as set forth in claim 2, wherein, when the clutchless shifting unit determines that a clutchless down-shift operation can be implemented, the throttle operation unit holds a control state so that, during the clutchless down-shift operation, implementation of a throttle control is not performed, nor a change to a degree of opening of the throttle valve is not given, either of which becomes a disturbance to the clutchless down-shift operation.

10. The transmission control device of a motorcycle as set forth in claim 2, wherein, when the clutchless shifting unit determines that a clutchless down-shift operation can be implemented, the ignition-timing control unit holds a control state so that, during the clutchless down-shift operation, implementation of an ignition-timing control is not performed, nor a change to ignition-timing is not given, either of which becomes a disturbance to the clutchless down-shift operation.

* * * * *